US010302200B2

(12) United States Patent
Dietle

(10) Patent No.: US 10,302,200 B2
(45) Date of Patent: May 28, 2019

(54) SEAL FOR BI-DIRECTIONAL ROTATION AND PRESSURE

(71) Applicant: KALSI ENGINEERING INC., Sugar Land, TX (US)

(72) Inventor: Lannie L. Dietle, Houston, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 0 days.

(21) Appl. No.: 15/976,598

(22) Filed: May 10, 2018

(65) Prior Publication Data
US 2018/0335146 A1 Nov. 22, 2018

Related U.S. Application Data

(60) Provisional application No. 62/603,075, filed on May 16, 2017.

(51) Int. Cl.
F16J 15/32 (2016.01)
F16J 15/3204 (2016.01)
F16J 15/324 (2016.01)
F16J 15/3244 (2016.01)

(52) U.S. Cl.
CPC ......... F16J 15/3204 (2013.01); F16J 15/324 (2013.01); F16J 15/3244 (2013.01)

(58) Field of Classification Search
CPC ..... F16J 15/3204; F16J 15/324; F16J 15/3244
See application file for complete search history.

(56) References Cited

U.S. PATENT DOCUMENTS

| 2,188,857 | A | 1/1940 | Chievitz |
| 3,497,225 | A | 2/1970 | Workman |
| 3,730,284 | A | 5/1973 | Striegler |
| 3,744,805 | A | 7/1973 | Heinrich |

(Continued)

FOREIGN PATENT DOCUMENTS

| GB | 499480 | 1/1939 |
| WO | 20060104605 A2 | 10/2006 |

OTHER PUBLICATIONS

International Search Report and Written Opinion dated Aug. 28, 2018 for corresponding PCT/US2018/032405.

(Continued)

Primary Examiner — Gilbert Y Lee
(74) Attorney, Agent, or Firm — Bracewell LLP; Douglas W. Rommelmann

(57) ABSTRACT

A hydrodynamically lubricating rotary seal for differential pressure acting in either axial direction that establishes compressed sealing engagement with a relatively rotatable surface and wedges a film of lubricating fluid into the interface between the rotary seal and the relatively rotatable surface in response to relative rotation that may occur in the clockwise or counter-clockwise direction. A multi-function edge and angled flank of the hydrodynamic wave form are truncated by the lubricant end of the seal, improving the dynamic performance of the seal in circumstances where the pressure acting on the environment end of the seal is greater than the pressure acting on the lubricant end of the seal. This improvement is believed to be the result of reduced contact pressure, and reduced radial deformation of the wave form, compared to prior art seals.

33 Claims, 12 Drawing Sheets

(56) References Cited

U.S. PATENT DOCUMENTS

| | | |
|---|---|---|
| 3,838,862 A | 10/1974 | Fern |
| 3,868,105 A | 2/1975 | Bentley |
| 3,901,517 A | 8/1975 | Heathcott |
| 3,921,987 A | 11/1975 | Johnston et al. |
| 3,927,600 A | 12/1975 | Peisker |
| 3,929,340 A | 12/1975 | Peisker |
| 3,973,781 A | 8/1976 | Grorich |
| 3,984,113 A | 10/1976 | Bentley |
| 4,067,407 A | 1/1978 | Berg |
| 4,094,519 A | 6/1978 | Heyn et al. |
| 4,118,856 A | 10/1978 | Bainard et al. |
| 4,183,543 A | 1/1980 | Antonini |
| 4,193,606 A | 3/1980 | Iverson |
| 4,231,579 A | 11/1980 | Scannell |
| 4,281,724 A | 8/1981 | Garrett |
| 4,283,064 A | 8/1981 | Staab et al. |
| 4,288,083 A | 9/1981 | Braconier |
| 4,336,945 A | 6/1982 | Christiansen et al. |
| 4,372,400 A | 2/1983 | Beimgraben |
| 4,383,691 A | 5/1983 | Potter |
| 4,387,902 A | 6/1983 | Conover |
| 4,399,998 A | 8/1983 | Otto |
| 4,440,405 A | 4/1984 | Schaus et al. |
| 4,441,722 A | 4/1984 | Pichler |
| 4,451,050 A | 5/1984 | Repella |
| 4,476,944 A | 10/1984 | Beimgraben |
| 4,484,753 A | 11/1984 | Kalsi |
| 4,542,573 A | 9/1985 | Bainard |
| 4,610,319 A | 9/1986 | Kalsi |
| 4,619,534 A | 10/1986 | Daly et al. |
| 4,671,519 A | 6/1987 | Bras et al. |
| 4,705,277 A | 11/1987 | Repella |
| 4,729,569 A | 3/1988 | Muller et al. |
| 4,739,998 A | 4/1988 | Steusloff et al. |
| 4,750,747 A | 6/1988 | Holzer |
| 4,770,548 A | 9/1988 | Otto |
| 4,783,086 A | 11/1988 | Bras |
| 4,789,166 A | 12/1988 | Rericha et al. |
| 5,002,289 A | 3/1991 | Yasau et al. |
| 5,139,275 A | 8/1992 | Ehrmann et al. |
| 5,143,385 A | 9/1992 | Sponagel et al. |
| 5,178,215 A | 1/1993 | Yenullis et al. |
| 5,190,299 A | 3/1993 | Johnston |
| 5,195,754 A | 3/1993 | Dietle |
| 5,195,757 A | 3/1993 | Dahll |
| 5,224,557 A | 7/1993 | Yenulis |
| 5,230,520 A | 7/1993 | Dietle et al. |
| 5,427,387 A | 6/1995 | Johnston |
| 5,482,296 A | 1/1996 | Peppiatt et al. |
| 5,511,886 A | 4/1996 | Sink |
| 5,647,444 A | 7/1997 | Williams |
| 5,662,181 A | 9/1997 | Williams |
| 5,678,829 A | 10/1997 | Kalsi |
| 5,692,757 A | 12/1997 | Straub |
| 5,704,615 A | 1/1998 | Wheeler |
| 5,711,534 A | 1/1998 | Bengoa et al. |
| 5,738,358 A | 4/1998 | Kalsi et al. |
| 5,763,956 A | 6/1998 | Metz et al. |
| 5,791,658 A | 8/1998 | Johnston |
| 5,823,541 A | 10/1998 | Dietle et al. |
| 5,873,576 A | 2/1999 | Dietle et al. |
| 5,915,696 A | 6/1999 | Onuma et al. |
| 5,921,555 A | 7/1999 | Johnston |
| 6,007,105 A | 12/1999 | Dietle et al. |
| 6,016,880 A | 1/2000 | Hall et al. |
| 6,036,192 A | 3/2000 | Dietle et al. |
| 6,105,968 A | 8/2000 | Yen et al. |
| 6,109,618 A | 8/2000 | Dietle |
| 6,120,036 A | 9/2000 | Kalsi et al. |
| 6,139,020 A | 10/2000 | Friend et al. |
| 6,189,896 B1 | 2/2001 | Dickey et al. |
| 6,227,547 B1 | 5/2001 | Dietle et al. |
| 6,315,302 B1 | 11/2001 | Conroy et al. |
| 6,334,619 B1 | 1/2002 | Dietle et al. |
| 6,354,385 B1 | 3/2002 | Ford et al. |
| 6,382,634 B1 | 5/2002 | Dietle et al. |
| 6,431,552 B1 | 8/2002 | Ulrich |
| 6,439,866 B1 | 8/2002 | Farkas et al. |
| 6,494,462 B2 | 12/2002 | Dietle |
| 6,554,016 B2 | 4/2003 | Kinder |
| 6,561,520 B2 | 5/2003 | Kalsi et al. |
| 6,685,194 B2 | 2/2004 | Dietle et al. |
| 6,767,016 B2 | 7/2004 | Gobeli et al. |
| 7,052,020 B2 | 5/2006 | Gobeli et al. |
| 7,770,898 B2 | 8/2010 | Dietle et al. |
| 8,075,000 B2 | 12/2011 | James et al. |
| 8,505,924 B2 | 8/2013 | Dietle et al. |
| 8,550,467 B2 | 10/2013 | Dietle et al. |
| 9,086,151 B2 | 7/2015 | Dietle et al. |
| 9,103,445 B2 | 8/2015 | Schroeder et al. |
| 9,109,703 B2 | 8/2015 | Dietle et al. |
| 9,121,503 B2 | 9/2015 | Dietle et al. |
| 9,121,504 B2 | 9/2015 | Dietle et al. |
| 2001/0024016 A1* | 9/2001 | Gobeli ............... F16J 15/164 277/400 |
| 2004/0104536 A1* | 6/2004 | Gobeli ............. F16J 15/3236 277/400 |
| 2006/0214379 A1* | 9/2006 | James ............... F16J 15/166 277/404 |
| 2007/0013143 A1 | 1/2007 | Schroeder et al. |
| 2009/0001671 A1* | 1/2009 | Dietle ............... F16J 15/164 277/559 |
| 2009/0250881 A1 | 10/2009 | Dietle et al. |
| 2010/0259015 A1 | 10/2010 | Dietle |

OTHER PUBLICATIONS

Kalsi, M.S., et al. "A Novel High-Pressure Rotary Shaft Seal Facilitates Innovations in Drilling and Production Equipment.", SPE#37627, 1997.

* cited by examiner

SEAL FOR BI-DIRECTIONAL ROTATION AND PRESSURE

CROSS-REFERENCE TO RELATED APPLICATIONS

This application claims the benefit of U.S. Provisional Application Ser. No. 62/603,075 filed on May 16, 2017, by Lannie L. Dietle and entitled "Seal for bi-directional pressure and rotation." Applicant incorporates by reference herein Application Ser. No. 62/603,075 in its entirety.

BACKGROUND OF THE INVENTION

Field of the Invention

The present invention relates generally to rotary seals for establishing sealing between relatively rotatable machine components and separating a lubricant-type first fluid from a second fluid, where the geometry of the seal interacts with the first fluid during relative rotation to wedge a lubricating film into the dynamic sealing interface between the seal and a relatively rotatable surface.

Description of the Related Art

Assignee Kalsi Engineering, Inc. has manufactured and patented numerous hydrodynamic rotary seals over the years designed to accommodate various operating conditions and parameters. Typically, these hydrodynamic rotary seals comprised a generally circular rotary seal that established sealing between relatively rotatable machine components for lubricant retention and environmental exclusion. The rotary seals incorporated seal geometry that interacts with the lubricant during relative rotation to distribute a lubricant film within a dynamic sealing interface.

One such hydrodynamic rotary seal manufactured by Kalsi Engineering, Inc. is described in U.S. Pat. No. 7,562,878, and related continuation U.S. Pat. Nos. 8,056,904 and 9,086,151. The hydrodynamic rotary seal described in these patents includes a hydrodynamically lubricating geometry employed to partition a lubricant from an environment. A dynamic sealing lip with a dynamic sealing surface establishes compressed sealing engagement with a relatively rotatable surface, and wedges a film of lubricating fluid into the interface between the dynamic sealing lip and the relatively rotatable surface in response to relative rotation that may occur in the clockwise or the counter-clockwise direction. A wave form incorporating an elongated dimple provides the gradual convergence, efficient impingement angle, and gradual interfacial contact pressure rise that are conducive to efficient hydrodynamic wedging. Skewed elevated contact pressure zones produced by compression edge effects provide for controlled lubricant movement within the dynamic sealing interface between the seal and the relatively rotatable surface, producing enhanced lubrication and low running torque.

The patented hydrodynamic rotary seal described above has been an operationally- and commercially successful seal-particularly in applications where the pressure of the lubricant fluid is greater than the pressure of the environment or second fluid. FIG. 1 of the patents shows the situation where the pressure of the lubricant or first fluid (6) is greater than the pressure of the second fluid (7), and a chamber (23) filled with the lubricant fluid exists between a radially inward-facing, cylindrical inner peripheral surface of the seal body (2) and a relatively rotatable surface (5). The pressure differential across the seal forces the seal against the environment-side wall (13) of the seal groove (26).

It is well known within the elastomeric seal industry that the resulting differential pressure acts through the elastomeric material of the seal as if the elastomeric material were a fluid. When the pressure of the first fluid (6) is less than the pressure of the second fluid (7) in the seal assembly of FIG. 1 of the patents, the pressure differential across the seal forces the seal against the lubricant-side wall (12) of the seal groove. Among other places, this differential pressure acts over the axial length between a first footprint edge (17) and a first seal end (14), producing a radially inward-acting force; i.e., a force acting toward the relatively rotatable surface. This force causes spreading of the interfacial contact footprint (16), and causes increased contact pressure within the interfacial contact footprint, both of which are believed to be detrimental to rotary performance of the seal. This radially inward-acting force also causes the radially inward-facing, cylindrical inner peripheral surface to move radially inward toward and potentially contact the relatively rotatable surface, and this deformation is believed to be detrimental to rotary performance of the seal. This radially inward-acting force can collapse the elongated dimple against the relatively rotatable surface, interfering with the interfacial lubrication that would otherwise result from the presence of the elongated dimple. Additionally, the collapse of the elongated dimple can eliminate the reentrant footprint edges (68CW, 68CCW) and circumferentially projecting edges (66CW, 66CCW) of the interfacial contact footprint shown in FIG. 2C of the patents, which is detrimental to seal performance.

It is desired to have a hydrodynamic rotary seal that is directed at prolonging seal life in rotary operating conditions where pressure of the second fluid may be significantly higher than the pressure of the first fluid, while also retaining the ability to operate well in operating conditions where the pressure of the first fluid is significantly greater than the pressure of the second fluid.

SUMMARY OF THE INVENTION

The present invention relates generally to rotary seals for establishing sealing between relatively rotatable machine components and separating a lubricant-type first fluid from a second fluid, where the geometry of the seal interacts with the first fluid during relative rotation to wedge a lubricating film into the dynamic sealing interface between the seal and a mating relatively rotatable surface. The geometry is suitable for clockwise and counter-clockwise rotation, and differential pressure acting in either axial direction.

The invention is an improvement over the type of seal described in commonly assigned U.S. Pat. Nos. 7,562,878, 8,056,904 and 9,086,151, and is directed at prolonging seal life in rotary operating conditions where pressure of the second fluid may be significantly higher than the pressure of the first fluid, while also retaining the ability to operate well in operating conditions where the pressure of the first fluid is significantly greater than the pressure of the second fluid. The invention positions the lubricant end of the seal body at a location that forms a radially undulating external corner with an angled flank and multi-function edge (and especially with a ramp section of the multi-function edge), as opposed to a location that forms a circular external corner with the aforementioned radially inward-facing, cylindrical inner peripheral surface of the body that is shown in U.S. Pat. Nos. 7,562,878, 8,056,904 and 9,086,151.

The present invention omits entirely the radially inward-facing, cylindrical inner peripheral surface of the seal body present in U.S. Pat. Nos. 7,562,878, 8,056,904 and 9,086, 151. This dramatically reduces the area over which differential pressure can act to create radially inward-acting force when the pressure of the second fluid is greater than the pressure of the first fluid. This reduces interfacial contact pressure and pressure-induced seal deformation, which improves the ability of the seal to withstand differential pressure acting from the second fluid toward the first fluid.

The invention is directed at equipment such as the oilfield rotary control device (RCD) and hydraulic swivels. In other words, it can be used as an RCD seal or as a hydraulic swivel seal, and can be used in other types of equipment.

The rotary seal is typically located by a first machine component for dynamic sealing engagement with a generally cylindrical, relatively rotatable surface of a second machine component, such as a shaft. The rotary seal is typically used as a partition between a first fluid of a lubricant supply and a second fluid, and for retaining a volume of the first fluid.

Preferably, the rotary seal has two generally axially-facing surfaces forming a first seal end and a second seal end facing in generally opposite directions. The first and second seal ends are preferably planer surfaces. Preferably, the rotary seal has a dynamic sealing surface of annular form facing in a generally radially inward direction and located in intermediate relation to the first and second seal ends.

Preferably, the rotary seal has a multi-function edge that extends in a generally circumferential direction and is located in intermediate relation to the dynamic sealing surface and the first seal end. This multi-function edge has a first edge end circumferentially separated from a second edge end. Preferably, at least a portion of the multi-function edge is skewed with respect to the second seal end, and the first edge end is farther from the second seal end compared to the second edge end. At least a portion of the multi-function edge is generally convex when viewed in longitudinal cross-section.

Preferably, the rotary seal has an angled flank that is located in intermediate relation to and adjoins the first seal end and the multi-function edge, and forms an obtuse angle with the first seal end. Preferably, the angled flank is circumferentially discontinuous.

Preferably, a circumferential portion of the multi-function edge forms a ramp section having a first ramp end at the first edge end, and a second ramp end located intermediate to the first edge end and the second edge end. Preferably, the ramp section curves radially outward from the second ramp end, and the ramp section is recessed relative to the dynamic sealing surface at the first ramp end. Preferably, no portion of the angled flank is located between the first ramp end and the first seal end.

Preferably, a recess flank is located in intermediate location to the dynamic sealing surface and the ramp section and adjoins the dynamic sealing surface, and at least a portion of the recess flank is generally convex when viewed in longitudinal cross-section.

Preferably, a recess is situated in intermediate location to a portion of the dynamic sealing surface and the first seal end. Preferably, this recess is formed at least in part from the ramp section and at least in part from the recess flank, at least a portion of the recess having a sloping profile in a circumferential direction and forming a smooth transition with the dynamic sealing surface in a circumferential direction.

Preferably, the first seal end is adjacent to, truncates, and forms an inner body corner with the angled flank and the ramp section, and preferably the first seal end has a radial depth that varies and the inner body corner preferably undulates in a radial direction. Preferably, the inner body corner is substantially parallel to the second seal end.

Preferably, the rotary seal has a plastic liner having a generally radially inward-facing surface forming at least part of the dynamic sealing surface. Preferably, the plastic liner has a first liner end facing in a generally axial direction and forming the inner body corner and part of the first seal end. Preferably, the plastic liner undulates radially at the first seal end.

The rotary seal is preferably produced by the following method:

(a) Providing a generally ring-shaped seal body having an original lubricant end and a second seal end facing in generally opposite axial directions, and having a generally radially inward-facing dynamic sealing surface of annular form located in intermediate relation to the original lubricant end and the second seal end, and having a multi-function edge extending in a generally circumferential direction and located in intermediate relation to the dynamic sealing surface and the original lubricant end. The multi-function edge having a first edge end circumferentially separated from a second edge end, at least a portion of the multi-function edge being generally convex when viewed in longitudinal cross-section, and the first edge end being farther from the second seal end compared to the second edge end. The seal body having an angled flank located in intermediate relation to the original lubricant end and the multi-function edge. A circumferential portion of the multi-function edge forms a ramp section having a first ramp end at the first edge end and a second ramp end intermediate to the first edge end and the second edge end. The ramp section curves radially outward from the second ramp end and the ramp section is recessed relative to the dynamic sealing surface at the first ramp end. The seal body having a recess flank located in intermediate relation to the dynamic sealing surface and the ramp section and adjoining the dynamic sealing surface, at least a portion of the recess flank being generally convex when viewed in longitudinal cross-section. The seal body having a recess located in intermediate relation to the dynamic sealing surface and the original lubricant end and formed at least in part from the ramp section and the recess flank, at least a portion of the recess having a sloping profile in a circumferential direction and forming a smooth transition with the dynamic sealing surface in a circumferential direction. A plastic liner forms the dynamic sealing surface; and (b) shortening the seal axially by a machining process, removing the original lubricant end and producing a first seal end.

Preferably, the machining process truncates the ramp section and the angled flank.

Preferably, the machining process produces a first liner end that is a generally axially-facing machined end of the plastic liner, causing the plastic liner to terminate at the first seal end.

Preferably, the machining process removes a portion of the angled flank that is adjacent to the ramp section, and removes a circumferential portion of the angled flank.

The original lubricant end has a surface area before the machining process and the first seal end has a surface area after the machining process, wherein the machining process produces the first seal end at an axial location that preferably results in the surface area of the first seal end being greater than the surface area of the original lubricant end.

The original lubricant end has a radial depth before the machining process and the first seal end has a radial depth after the machining process, and the machining process preferably produces the first seal end at an axial location that results in the radial depth of the first seal end being greater than the radial depth of the original lubricant end.

Preferably, the machining process causes the axial distance between the dynamic sealing surface and the first seal end to be shorter than the axial distance between the dynamic sealing surface and the original lubricant end that existed prior to the machining process.

Preferably, the machining process creates an inner body corner between the angled flank and the first seal end, and between the ramp section and the first seal end, the inner body corner being an outside corner.

Prior to machining, the rotary seal preferably has a generally radially inward-facing original body inner surface adjoining the original lubricant end and located in intermediate relation to the original lubricant end and the angled flank, and preferably, the machining process removes all of the original body inner surface. Preferably, the rotary seal has an inside corner between the original body inner surface and the angled flank, and preferably, the machining process removes the inside corner.

BRIEF DESCRIPTION OF THE SEVERAL VIEWS OF THE DRAWINGS

The invention is better understood by reading the detailed description of the preferred embodiments which follow and by examining the accompanying drawings, in which.

DETAILED DESCRIPTION OF THE PREFERRED EMBODIMENTS

Figure 1A:
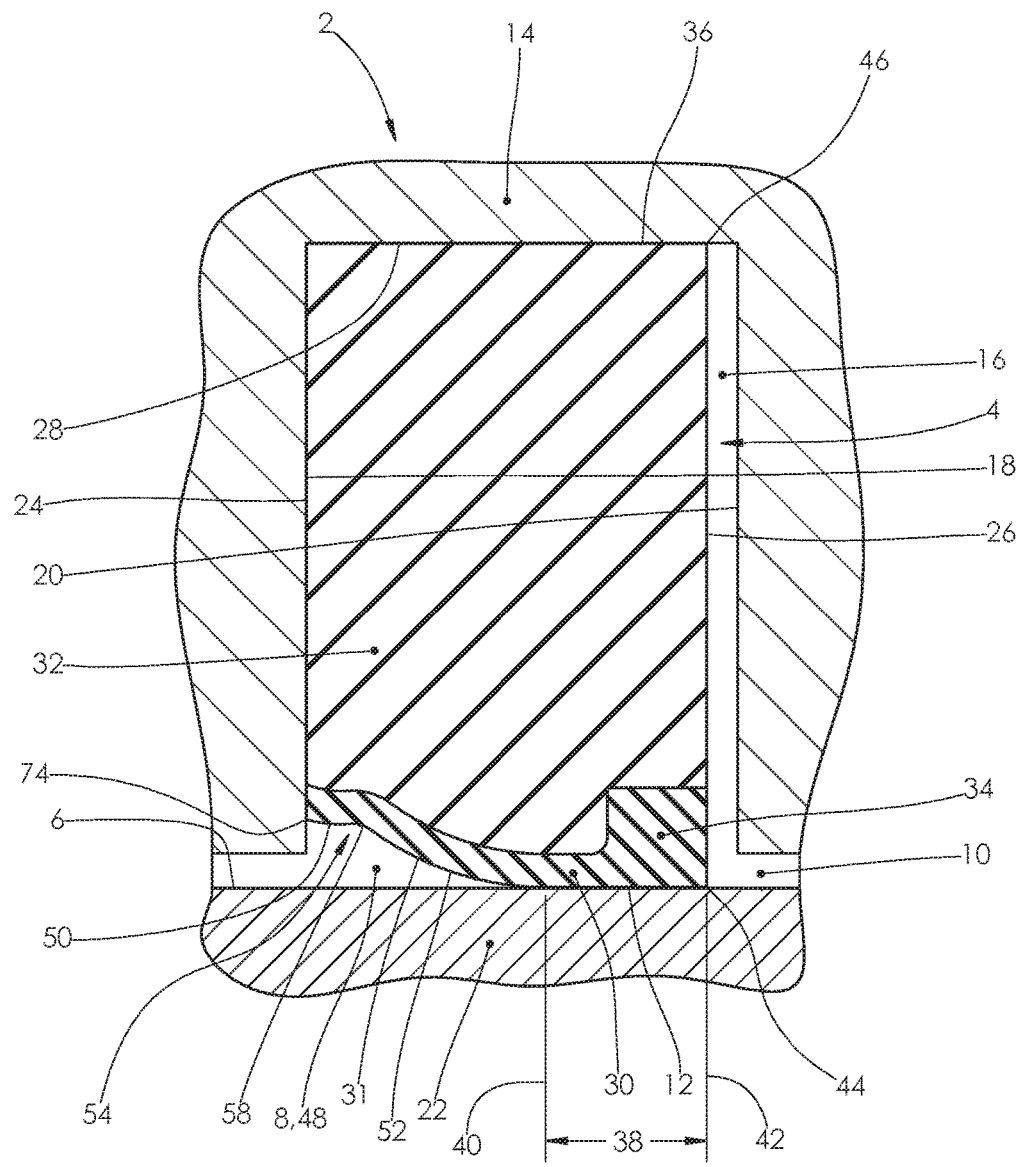
FIG. 1A is an enlarged fragmentary longitudinal cross-sectional view of a machine assembly having a hydrodynamic rotary seal, the machine assembly in an operating condition where a second fluid pressure acting on a second seal end of the rotary seal is greater than a first fluid pressure acting on a first seal end of the rotary seal.
Figure 1B:
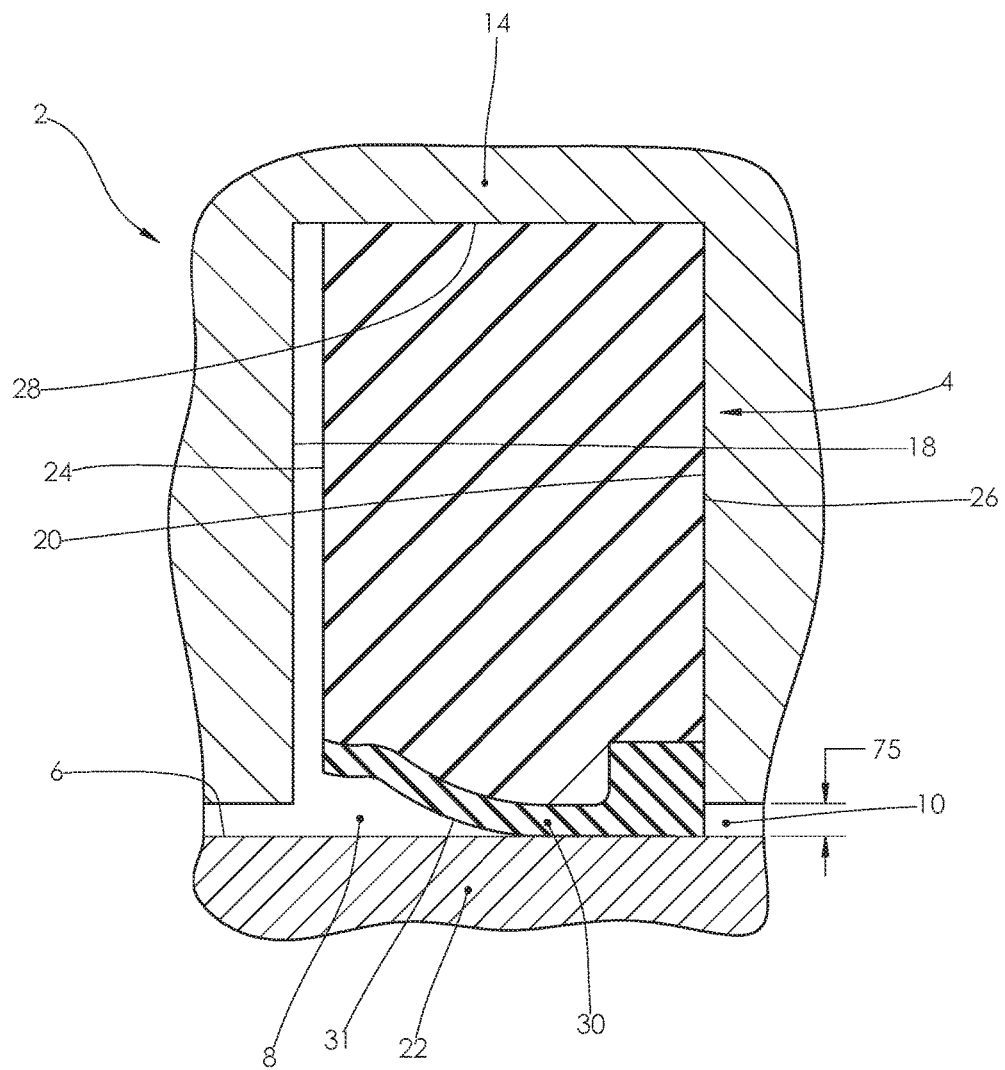
FIG. 1B is an enlarged fragmentary longitudinal cross-sectional view of the machine assembly of FIG. 1A in an operating condition where the first fluid pressure acting on the first seal end of the rotary seal is greater than the second fluid pressure acting on the second seal end of the rotary seal.
Figure 1C:
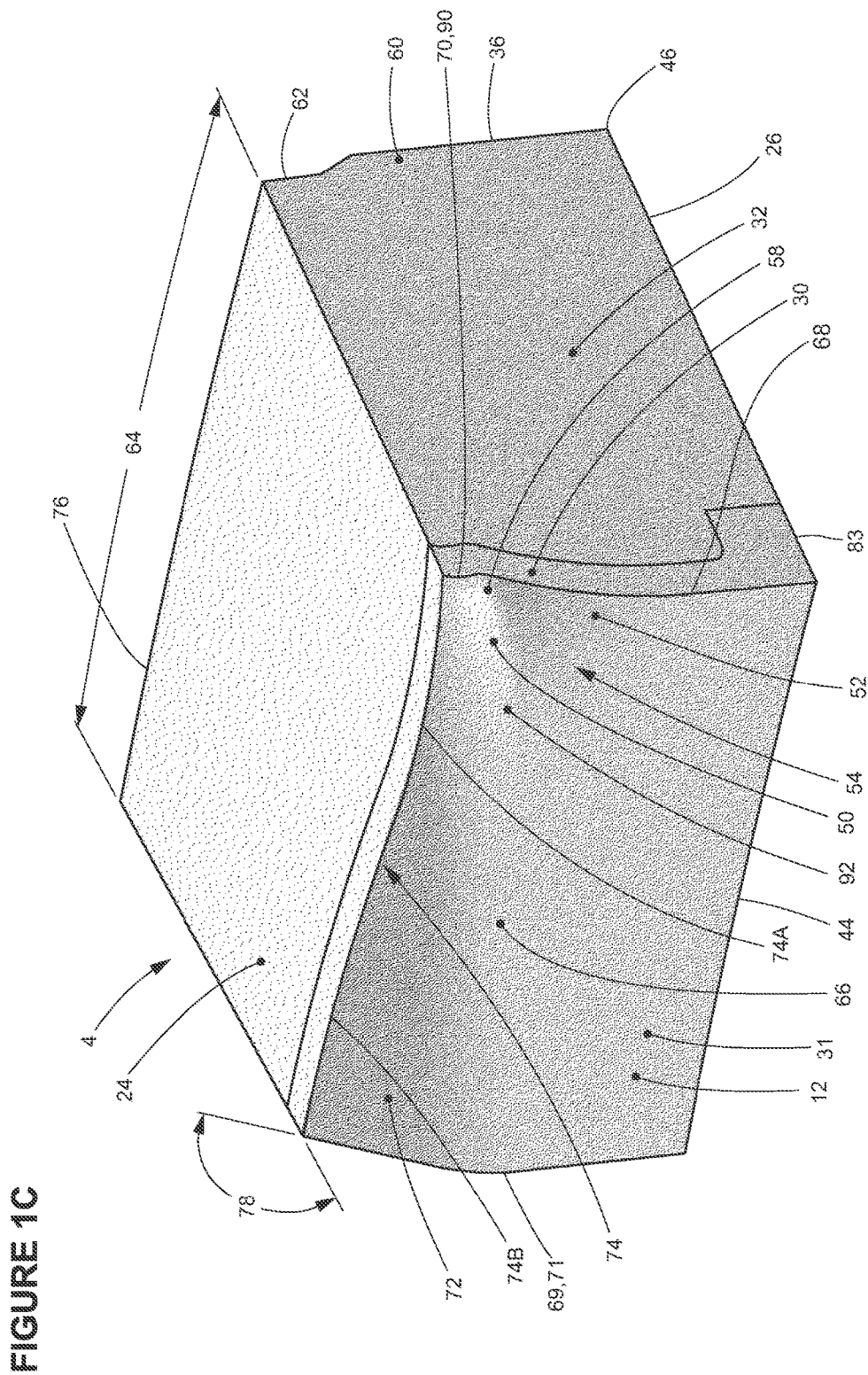
FIG. 1C is an enlarged fragmentary shaded perspective view, showing a segment of the rotary seal of FIGS. 1A and 1B in an uncompressed state, the segment illustrating one wave of a repetitive hydrodynamic wave pattern located on an inner periphery of the rotary seal.
Figure 1D:
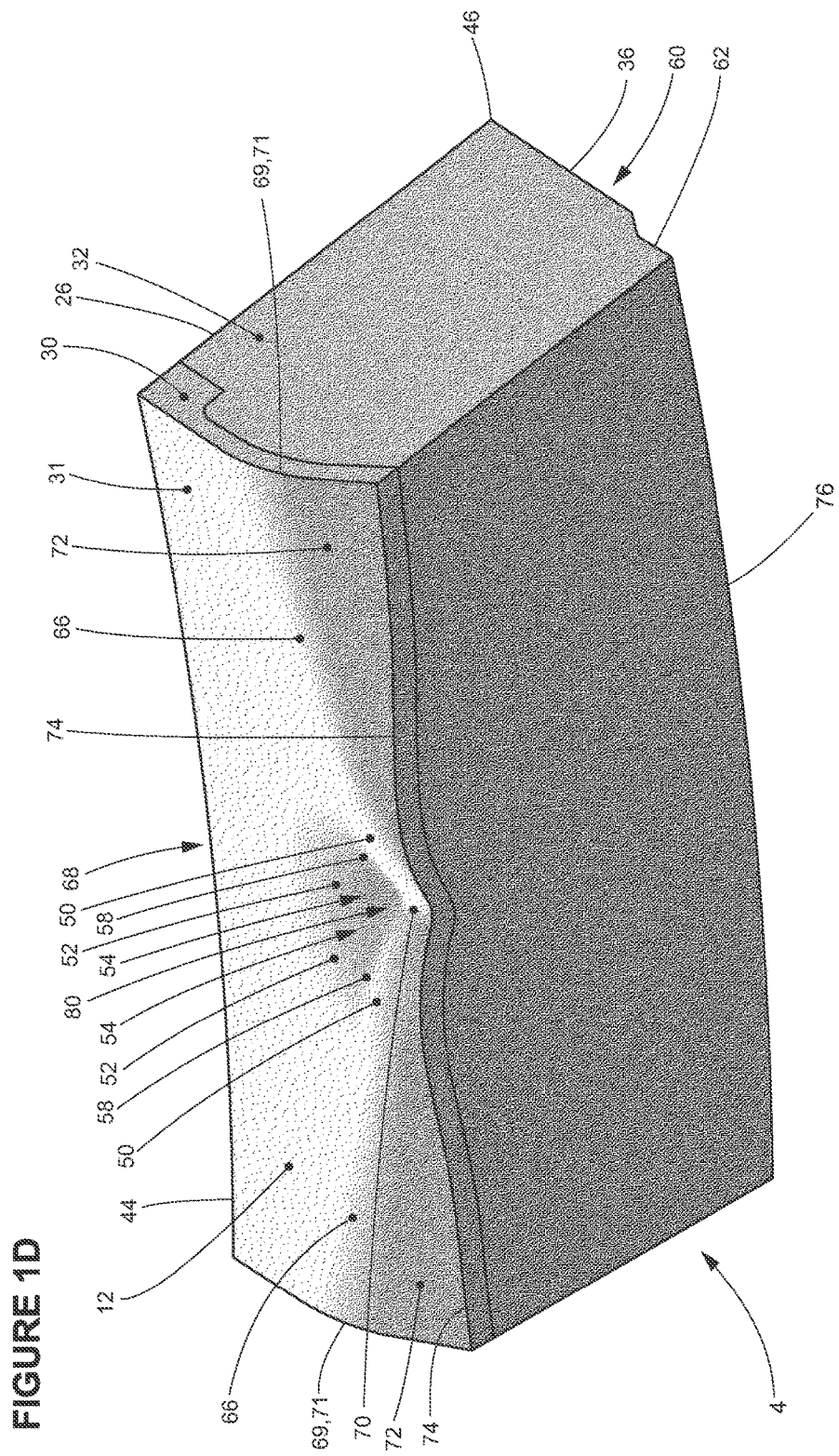
FIG. 1D is an enlarged fragmentary shaded perspective view, showing a segment of the same rotary seal in the uncompressed state, the segment including two oppositely clocked hydrodynamic waves adjoined at a first circumferential wave end located at the middle of the segment.
Figure 1E:
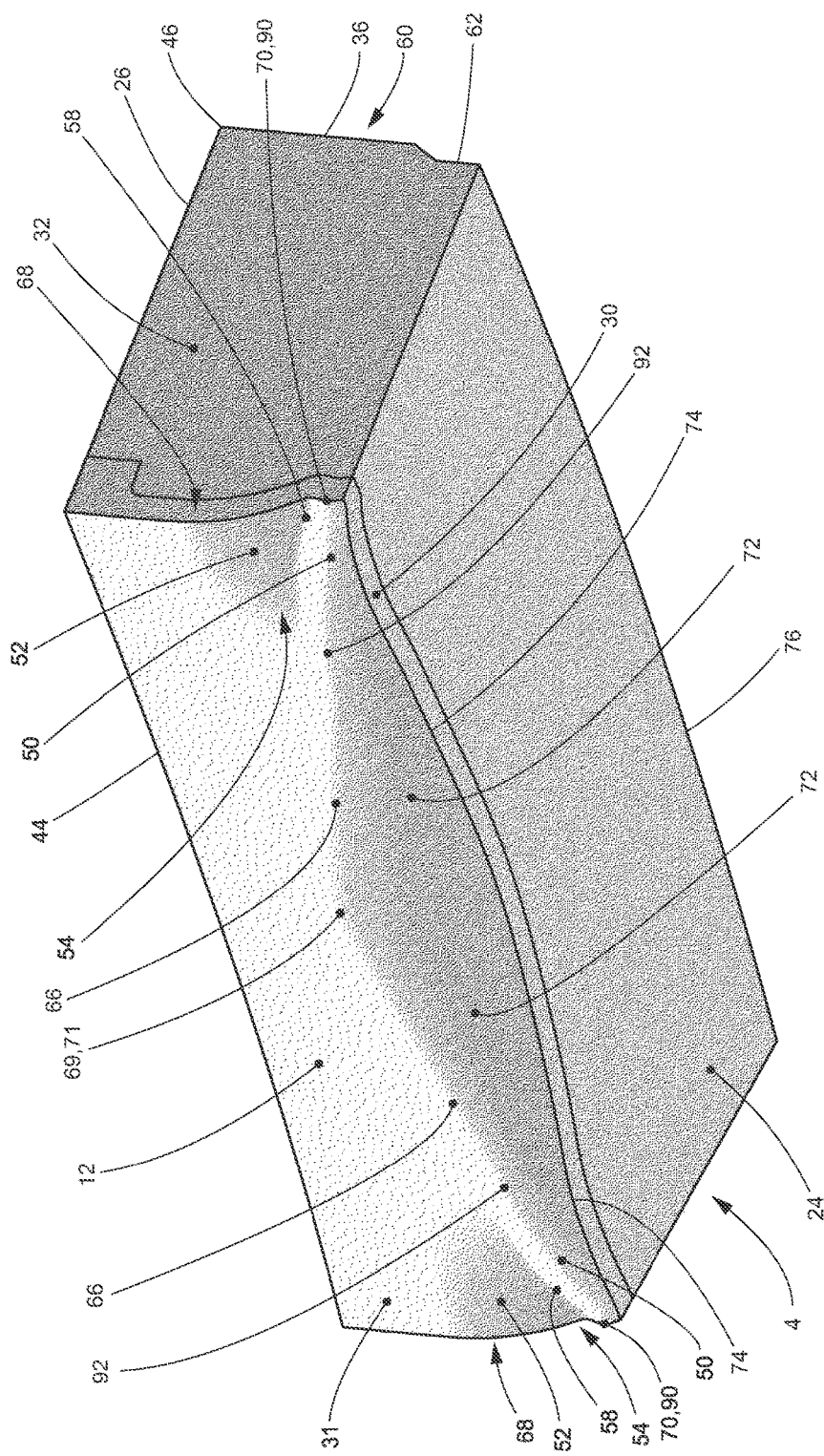
FIG. 1E is an enlarged fragmentary shaded perspective view, showing a segment of the same rotary seal in the uncompressed state, the segment including two oppositely clocked hydrodynamic waves adjoined at a second circumferential wave end located at the middle of the segment.
Figure 1F:
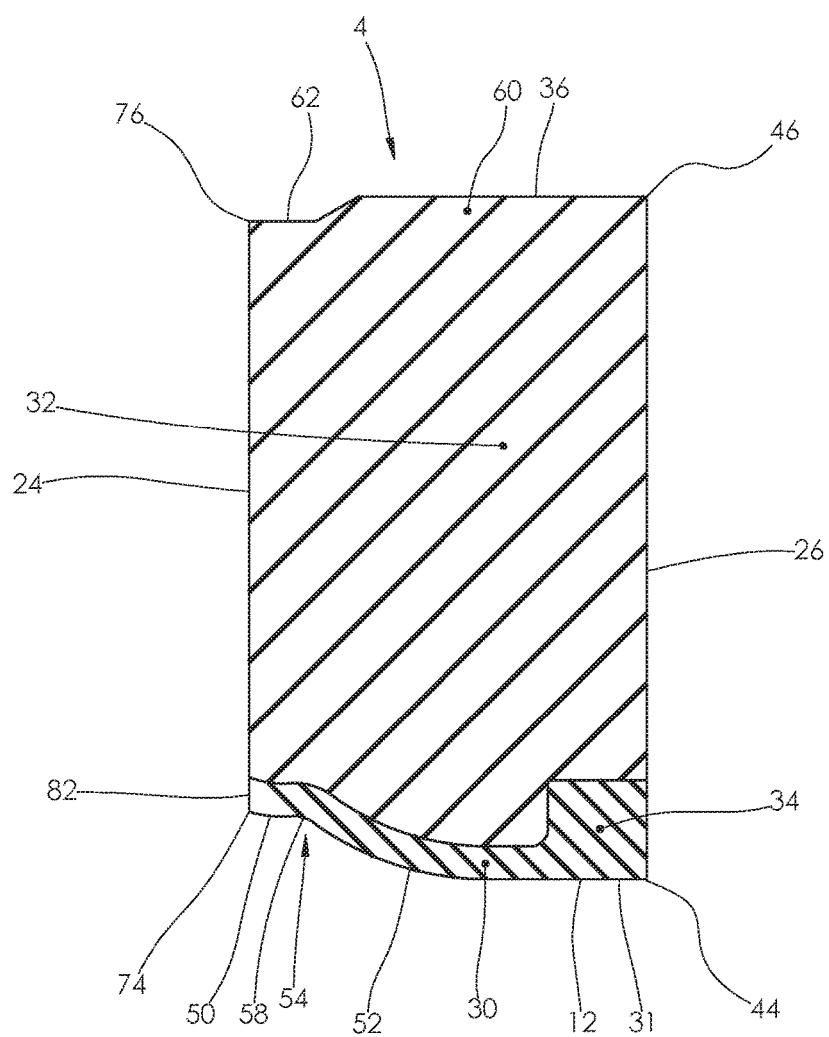
FIG. 1F is an enlarged fragmentary longitudinal cross-sectional view of the rotary seal taken through the first circumferential wave end, with the rotary seal in the uncompressed state.
Figure 1G:
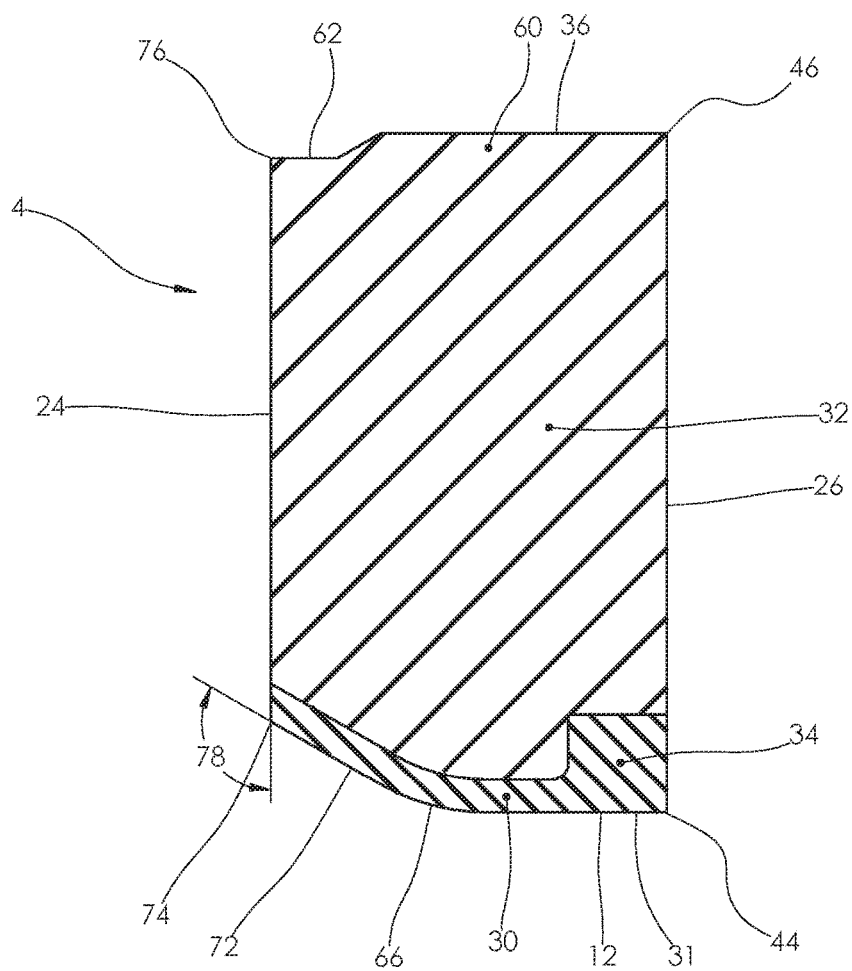
FIG. 1G is an enlarged fragmentary longitudinal cross-sectional view of the rotary seal taken through the second circumferential wave end, with the rotary seal in the uncompressed state.
Figure 1H:
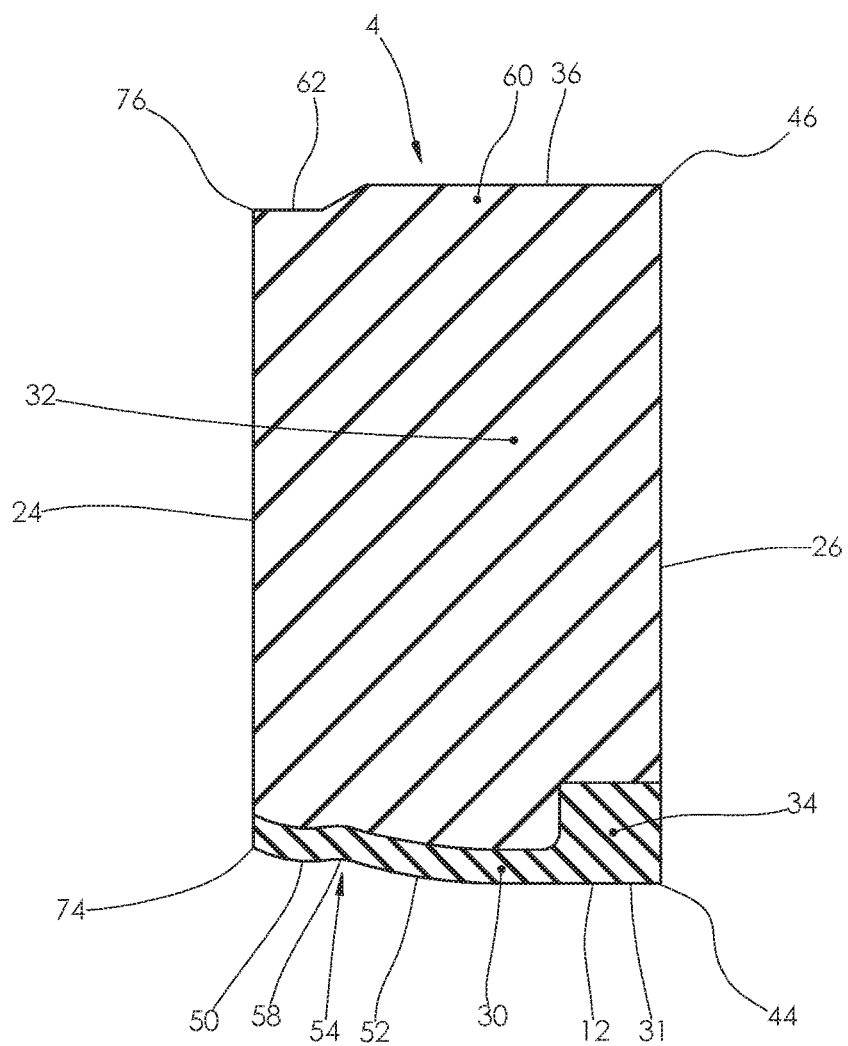
FIG. 1H is an enlarged fragmentary longitudinal cross-sectional view of the rotary seal taken at an angular location that is approximately halfway along the circumferential length of a ramp section, with the rotary seal in the uncompressed state.
Figure 1I:
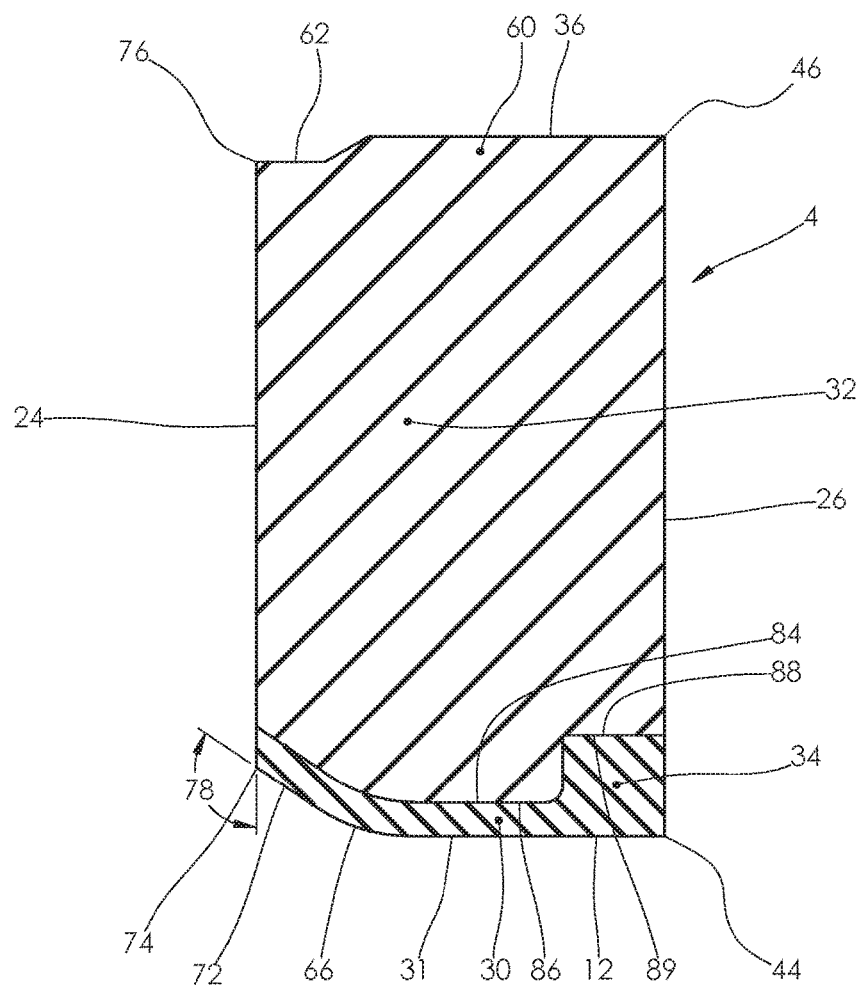
FIG. 1I is an enlarged fragmentary view of the rotary seal taken at an angular location that is approximately halfway between the ramp section and the second circumferential wave end, with the rotary seal in the uncompressed state.
Figure 1J:
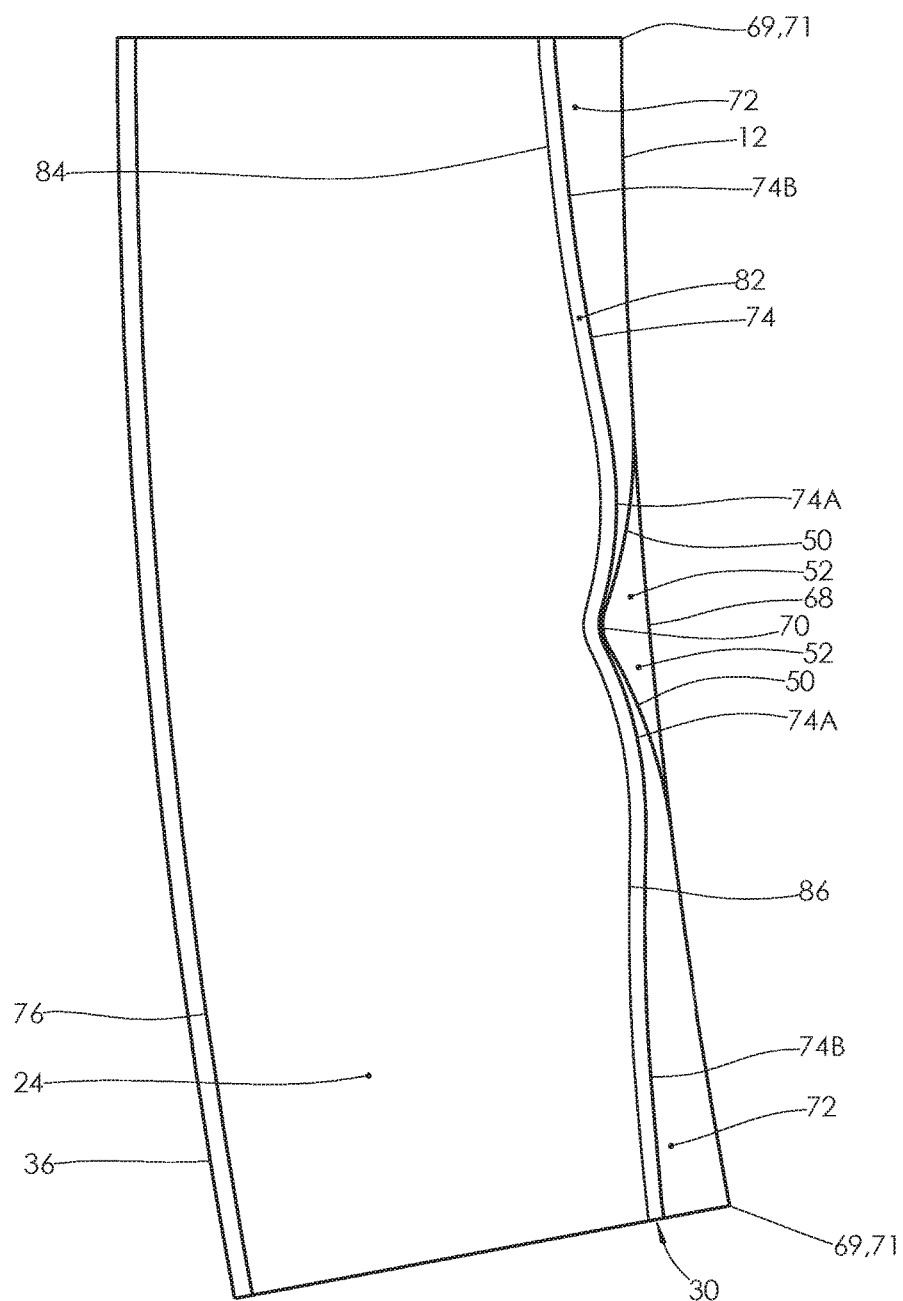
FIG. 1J is an enlarged fragmentary shaded perspective view, showing a segment of the same rotary seal in the uncompressed state, the segment including two oppositely clocked hydrodynamic waves adjoined at the first circumferential wave end as in FIG. 1D, with the view being perpendicular to the first seal end.
Figure 1K:
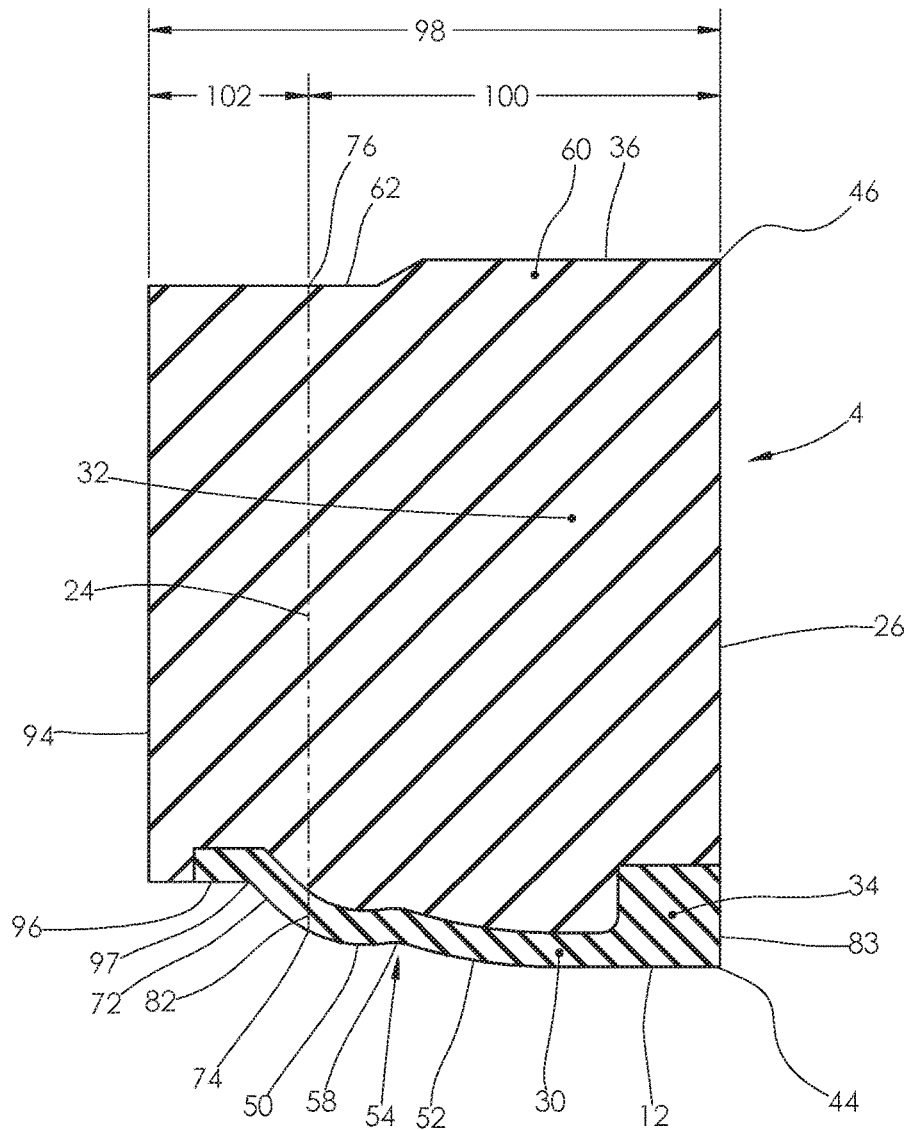
FIGS. 1K and 1L are enlarged fragmentary longitudinal cross-sectional views of the rotary seal taken through the first circumferential wave end, with the rotary seal in the uncompressed state, and showing methods of producing the rotary seal.
Figure 1L:
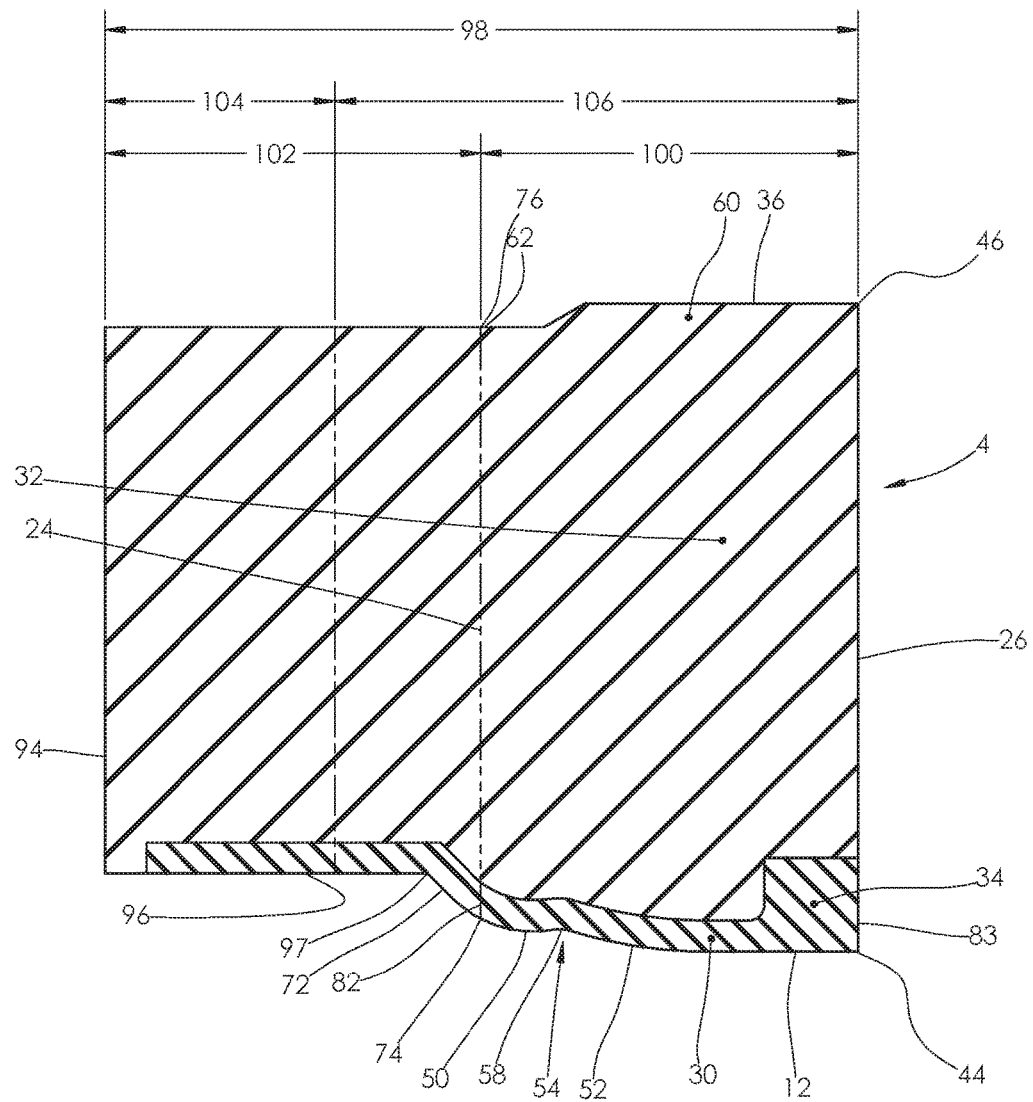

FIGS. 1A-1L show a rotary seal according to a preferred embodiment of the present invention. FIGS. 1A and 1B show this preferred embodiment in an installed condition, FIGS. 1C to 1J show the same preferred embodiment in an uninstalled condition, and FIGS. 1K and 1L illustrate a method of manufacturing the same preferred embodiment and alternate embodiments.

FIGS. 1A-1L should be studied together, to gain a more complete understanding of the invention, because the totality of the invention cannot be perfectly conveyed by any single figure. Features throughout this specification that are represented by like numbers have the same function. For orientation purposes, it should be understood that in the cross-sectional views of FIGS. 1A, 1B, 1F, 1G, 1H, 1I, 1K and 1L, the cutting plane of the cross-section is aligned with and passes through the theoretical axis of the seal. The term "axis" is well-understood in mechanical engineering, and in the field of drafting is sometimes illustrated using a centerline.

Description of FIG. 1A

FIG. 1A is a fragmentary longitudinal cross-sectional view of a machine assembly that is shown generally at 2. FIG. 1A provides a general overview of how the preferred embodiment of the present invention is employed when assembled into the machine assembly 2. A rotary seal of generally circular, ring-shaped configuration is shown generally at 4. The rotary seal 4 establishes sealing engagement with a relatively rotatable surface 6, to retain a volume of a first fluid 8, to partition the first fluid 8 from a second fluid 10, and to exclude the second fluid 10 and prevent intrusion of the second fluid 10 into the first fluid 8. For the purposes of this specification, the term "fluid" has its broadest meaning, encompassing both liquids and gases. The rotary seal 4 is designed for both static and dynamic sealing engagement with the relatively rotatable surface 6.

The rotary seal 4 includes at least one dynamic sealing surface 12 that is preferably also generally circular (i.e., ring-shaped) in form; generally circumferential. The dynamic sealing surface 12 is of generally annular form and adapted for dynamic sealing engagement with the relatively rotatable surface 6; i.e., adapted to form a sealing interface with the relatively rotatable surface 6. The rotary seal 4 incorporates hydrodynamic features that allow the seal to hydroplane on a lubricant film during periods of relative rotation between the rotary seal 4 and the relatively rotatable surface 6, regardless of whether the pressure of the second fluid 10 is greater than or less than the pressure of the first fluid 8.

In FIG. 1A, the rotary seal 4 is illustrated in the axial position it acquires when the pressure of the second fluid 10 is greater than the pressure of the first fluid 8. The rotary seal 4 is preferably a direct interference type of seal that is installed in radial compression between a first machine component 14 and the relatively rotatable surface 6. The rotary seal 4 may accurately be called a hydrodynamic rotary seal. The radial spacing of the relatively rotatable surface 6 and a peripheral wall 28 of the first machine component 14 is preferably sized to hold the rotary seal 4 in radial compression.

The rotary seal 4 is typically oriented (e.g., positioned) by the first machine component 14. For the purpose of illustrating a typical application, the first machine component 14 is illustrated as having a seal groove 16 of generally circular form that includes a first groove wall 18 and a second groove wall 20 that are in generally opposed relation to one another, and generally facing one another. The provisions for locating/orienting the rotary seal 4 can take other specific forms without departing from the spirit or scope of the invention.

In the hydrodynamic seal industry, the first groove wall 18 is often referred to as the "lubricant-side gland wall," and the second groove wall 20 is often referred to as the "environment-side gland wall." Although the first groove wall 18 and the second groove wall 20 are shown to be in fixed, permanent relation to one another, such is not intended to limit the scope of the invention, for the invention admits to other equally suitable forms. For example, the first groove wall 18 and/or the second groove wall 20 could be configured to be detachable from first machine component 14 for ease of maintenance and repair, but then assembled in more or less fixed position for locating the rotary seal 4. For another example, if the rotary seal 4 were only exposed to differential pressure acting in one axial direction, then it may be possible to have a design where only one seal-locating groove wall is provided for the axial support of the rotary seal 4, and for locating the rotary seal 4 axially.

Preferably, at least a portion of the dynamic sealing surface 12 is held in compressed, contacting relation with the relatively rotatable surface 6. The relatively rotatable surface 6 is a feature of a second machine component 22. In dynamic operation, the relatively rotatable surface 6 has relative rotation with respect to the dynamic sealing surface 12 of the rotary seal 4 and with respect to the first machine component 14. This invention has application where either the first machine component 14 or the second machine component 22, or both, are individually rotatable.

Rotary seal 4, being a generally circular entity, defines a theoretical axis (not shown), and the cross-section of FIG. 1A is a longitudinal cross-section type of illustration. Throughout this specification, the term "longitudinal cross-section" means a cross-section taken at a cutting plane that passes through and aligns with that theoretical axis; i.e., the theoretical axis lies on the cutting plane of the cross-section. The circumferential direction of relative rotation is normal (perpendicular) to the plane of the longitudinal cross-sections herein, and the theoretical axis of the rotary seal 4 generally coincides with the axis of the aforementioned relative rotation. All of the cross-sectional illustrations herein are longitudinal cross-sections.

Preferably, the first machine component 14 defines a theoretical axis that generally coincides with the axis of the aforementioned relative rotation. Preferably, the second machine component 22 also defines a theoretical axis that generally coincides with the axis of the aforementioned relative rotation.

The rotary seal 4 preferably defines a first seal end 24 that faces in a generally axial direction toward the first groove wall 18 and the first fluid 8. The rotary seal 4 preferably also defines a second seal end 26 that faces in a generally axial direction toward the second groove wall 20 and the second fluid 10. The second seal end 26 is preferably spaced away from the second groove wall 20 when the pressure of the second fluid 10 is greater than the pressure of the first fluid 8.

In the hydrodynamic seal industry, the first seal end 24 is often referred to as the "lubricant end," and the second seal end 26 is often referred to as the "environment end." The first seal end 24 and the second seal end 26 preferably face in generally axial, generally opposite directions, away from one another. The first seal end 24 and the second seal end 26 can take other specific forms without departing from the spirit or scope of the invention. For example, although the first seal end 24 and the second seal end 26 are shown to be generally parallel to one another, they need not be parallel to one another. The first seal end 24 preferably faces in a generally axial direction toward the first groove wall 18, and preferably contacts the first groove wall 18 and is supported by the first groove wall 18 when the pressure of the second fluid 10 is greater than the pressure of the first fluid 8. The first seal end 24 and the second seal end 26 are preferably the axial extremities of the rotary seal 4.

The seal groove 16 preferably includes a peripheral wall 28 that faces generally radially inward toward the rotary seal 4 and the relatively rotatable surface 6, and preferably the relatively rotatable surface 6 faces generally radially outward toward the rotary seal 4 and the peripheral wall 28. The relatively rotatable surface 6 of the second machine component 22 and the peripheral wall 28 of the first machine component 14 are located in radially spaced relation to each other.

The relatively rotatable surface 6 preferably takes the form of an externally oriented, substantially cylindrical surface, with the rotary seal 4 compressed radially between the first machine component 14 and the second machine component 22, with the axis of relative rotation being substantially parallel to the relatively rotatable surface 6. The rotary seal 4 is preferably located by the first machine component 14.

The rotary seal 4 preferably is composed of polymer, and preferably comprises a plastic liner 30 and an elastomeric energizer 32. Preferably, the plastic liner 30 is combined with the elastomeric energizer 32 in accordance with the general teachings of commonly assigned U.S. Pat. No. 5,738,358. The plastic liner 30 preferably has an enlarged rim 34 at one end thereof. The plastic liner 30 has a generally radially inward-facing surface 31. The dynamic sealing surface 12 is preferably part of the generally radially inward-facing surface 31 of the plastic liner 30.

When the rotary seal 4 is installed between the relatively rotatable surface 6 and the peripheral wall 28, a static sealing surface 36 of the rotary seal 4 preferably faces radially outward toward, and contacts and establishes sealing with, the peripheral wall 28. In other words, the static sealing surface 36 is preferably adapted to form a static sealing interface with the first machine component 14—and more specifically, to form a static sealing interface with the peripheral wall 28 of the first machine component 14. In an uninstalled condition of the rotary seal 4, the radial distance between the static sealing surface 36 and the dynamic sealing surface 12 preferably is greater than the radial distance between the relatively rotatable surface 6 and the peripheral wall 28. Because of this dimensional difference, installation of the rotary seal 4 between the relatively rotatable surface 6 and the peripheral wall 28 preferably causes radial compression of the elastomeric energizer 32, producing contact, sealing contact force, and a sealing interface between the static sealing surface 36 and the peripheral wall 28, and causing the dynamic sealing surface 12 of the plastic liner 30 to adjoin the relatively rotatable surface 6 of the second machine component 22 over an adjoining zone 38.

Preferably, the radial compression of the elastomeric energizer 32 produces a sealing zone between the dynamic sealing surface 12 and the relatively rotatable surface 6 that is referred to herein as the adjoining zone 38. The adjoining zone 38 is annular in form, and is a region where the dynamic sealing surface 12 of the rotary seal 4 adjoins the relatively rotatable surface 6 of the second machine component 22. The axial width of the adjoining zone 38 at a specific circumferential location changes as a function of temperature, and may change as the differential pressure acting across the seal changes.

Preferably, during relative rotation, the seal 4 rides on a microscopic film of the first fluid 8 that is pumped into the dynamic interface between the dynamic sealing surface 12 and the relatively rotatable surface 6, and in the absence of relative rotation the film is gradually squeezed out of the interface, and portions of the dynamic sealing surface 12 typically contact and abut the relatively rotatable surface. Sealing takes place at the adjoining zone 38 whether or not relative rotation is occurring, and whether or not the film of the first fluid 8 is present, preventing gross pressure-driven migration of the first fluid 8 and the second fluid 10 through the interface between the rotary seal 4 and the relatively rotatable surface 6.

In this specification, the definition of the words "adjoin," "adjoins" and "adjoining" includes the commonly accepted "adjoin" definition "to be close to or in contact with one another" that is provided by the Merriam-Webster online dictionary for the word "adjoin." Although this definition is provided herein, this is not an example of the inventor being his own lexicographer, since the definition given is simply the commonly understood definition.

The adjoining zone 38 has a zone first end 40 that is preferably generally wavy and non-circular and faces the first fluid 8, and has a zone second end 42 of preferably circular configuration that faces the second fluid 10. In the absence of relative rotation between the relatively rotatable surface 6 and the rotary seal 4, the radial force resulting from the radial compression of the elastomeric energizer 32 preferably causes an annular band of contact (and sealing contact pressure) between the relatively rotatable surface 6 and the rotary seal 4 to be established within the adjoining zone 38.

This band of contact within the adjoining zone 38 may take time to develop after cessation of relative rotation, due the squeeze film effect caused by a fluid film that is produced between the relatively rotatable surface 6 and the rotary seal 4 during periods of relative rotation.

During relative rotation, it is the shape of the rotary seal 4 (which is described more fully in conjunction with other figures) that causes the aforementioned microscopic film of the first fluid 8 to be forced between the relatively rotatable surface 6 and the dynamic sealing surface 12 within the adjoining zone 38, providing lubrication of the relatively rotatable surface 6 and the dynamic sealing surface 12. The creation of this film does not result in gross leakage of the first fluid 8 past the rotary seal 4.

Rotary seal 4 preferably incorporates an exclusionary intersection 44 of abrupt circular form that is substantially aligned with the direction of relative rotation between the dynamic sealing surface 12 and the relatively rotatable surface 6, and is adapted to exclude intrusion of the second fluid 10, in accordance with the teachings of commonly assigned U.S. Pat. No. 4,610,319. The dynamic sealing surface 12 terminates at the exclusionary intersection 44, and has a circular end and the exclusionary intersection 44.

The exclusionary intersection 44 is preferably of a configuration developing substantially no hydrodynamic wedging activity during relative rotation between dynamic sealing surface 12 and relatively rotatable surface 6. Preferably, the exclusionary intersection 44 presents a scraping edge to help exclude contaminant material from the adjoining zone 38 in the event of any relative axial movement between dynamic sealing surface 12 and relatively rotatable surface 6. The exclusionary intersection 44 need not be present unless abruptness and circularity are desired for more efficient exclusion of the second fluid 10. The exclusionary intersection 44, if present, is located axially remote from the first seal end 24.

It should be noted that, depending on the molding process, during molding, the exclusionary intersection 44 may be located at an interface between two different mold components, and a small amount of flash may develop at the exclusionary intersection 44. Within the molding industry, it is understood that this flash is preferably removed during post-molding processing, and the flash trimming operation may leave a small and potentially slightly irregular flash trimming chamfer at the exclusionary intersection 44.

Preferably, the static sealing surface 36 has a generally annular form, and terminates at an exclusion intersection 46 of abrupt circular form that is substantially aligned with the direction of relative rotation. During molding, the exclusion intersection 46 is typically located at an interface between two different mold components, and a small amount of flash may develop at the exclusion intersection 46. This flash is preferably removed after molding, and the flash trimming operation may leave a small and potentially slightly irregular flash trimming chamfer at the exclusion intersection 46.

During the presence of relative rotation between dynamic sealing surface 12 and relatively rotatable surface 6, at least a portion of the adjoining zone 38 is a dynamic sealing interface, with relative circumferential movement occurring between the dynamic sealing surface 12 and relatively rotatable surface 6. In the absence of relative rotation between the dynamic sealing surface 12 and the relatively rotatable surface 6, at least part of the adjoining zone 38 is a static sealing interface.

Peripheral wall 28 can be substantially parallel to the relatively rotatable surface 6 as shown herein, or if desired, could be non-parallel, as shown in FIGS. 4, 6, 7, 8 and 9 of commonly assigned U.S. Pat. No. 5,230,520.

In the preferred embodiment of the present invention, the adjoining zone 38 has an annular shape that varies in width around the circumference thereof due to the hydrodynamic geometry of the seal that is illustrated elsewhere herein. The hydrodynamic geometry produces a hydrodynamic wedging action in response to relative rotation between the rotary seal 4 and relatively rotatable surface 6. This hydrodynamic wedging action forces a film of lubricating fluid (i.e., a film of the first fluid 8) between the rotary seal 4 and the relatively rotatable surface 6 within the adjoining zone 38 for lubrication purposes, which reduces wear, torque and heat generation. In other words, the dynamic sealing surface 12 slips or hydroplanes on a film of lubricating fluid during periods of relative rotation between the dynamic sealing surface 12 and the relatively rotatable surface 6. When relative rotation stops, the hydroplaning activity stops, and a static sealing relationship is reestablished between the dynamic sealing surface 12 and the relatively rotatable surface 6. Preferably, a small net leakage of the first fluid 8 occurs during periods of relative rotation due to the hydroplaning activity, as the microscopic film of the first fluid 8 is pumped into and transferred across the dynamic sealing interface and into the second fluid 10. In a similar manner, metallic face seals and spring loaded lip seals also have a small net hydrodynamic pumping related leakage during periods of rotational operation.

The hydroplaning activity minimizes or prevents the typical dry rubbing wear and high friction, prolonging the life of the rotary seal 4 and the life of the relatively rotatable surface 6, and makes higher speed, compression, and differential pressure practical, even when a part of rotary seal 4 contacting relatively rotatable surface 6 is comprised of plastic. This seal is different than most plastic seals because the hydrodynamic action is planned, and is based on the highly evolved geometry of the waves of the seal, rather than resulting from random factors, such as slightly eccentric installation.

The zone second end or edge 42 (sometimes called the "environment edge") of the adjoining zone 38 is preferably substantially circular and substantially aligned with the possible directions of relative rotation between rotary seal 4 and relatively rotatable surface 6. The zone second end 42 is established by compression of the exclusionary intersection 44 against the relatively rotatable surface 6. Due to the zone second end 42 preferably being substantially circular and substantially aligned with the possible directions of relative rotation, the zone second end 42 does not produce a hydrodynamic wedging action in response to relative rotation between the rotary seal 4 and the relatively rotatable surface 6, thereby facilitating exclusion of the second fluid 10 in accordance with the teachings of commonly assigned U.S. Pat. No. 4,610,319.

The first machine component 14 and the second machine component 22 together typically define at least a portion of a chamber 48 for locating the first fluid 8 and thereby defining a lubricant supply for the rotary seal 4. The first fluid 8 is exploited in this invention to lubricate the dynamic sealing interface between the rotary seal 4 and the second machine component 22 during periods of relative rotation. The first fluid 8 is preferably a liquid-type lubricant such as a synthetic or natural oil, although other fluids may be suitable. The second fluid 10 may be any type of fluid that rotary seal 4 may be exposed to in service, including a lubricant. One purpose of the rotary seal 4 is to retain a volume of the first fluid 8.

As previously stated, in FIG. 1A, the rotary seal 4 is shown located in a position within seal groove 16 that would occur if the pressure of first fluid 8 was less than the pressure of second fluid 10. In such pressure conditions, the hydrostatic force resulting from the differential pressure acting over the area between the relatively rotatable surface 6 and the peripheral wall 28 forces the rotary seal 4 against the first groove wall 18. Owing to the complimentary shapes of the first seal end 24 and the mating first groove wall 18, the rotary seal 4 is partially supported by the first groove wall 18.

FIG. 1A also shows a ramp section 50, a recess flank 52, a recess 54 and an inner body corner 74 that are described more completely in conjunction with FIG. 1C and other figures herein. The ramp section 50, which is part of a multi-function edge that is described more completely in conjunction with FIG. 1C, preferably intersects, adjoins, and is adjacent to the first seal end 24, at the inner body corner 74. The recess flank 52 preferably adjoins and blends smoothly with the dynamic sealing surface 12. The recess 54 preferably includes a recess fillet 58 that is interposed between and is adjacent to the ramp section 50 and the recess flank 52. Within this specification, the recess 54 can be thought of as an indented surface that is formed by individual surface features including the convex ramp section 50 and the convex recess flank 52, and preferably also including the concave recess fillet 58. Preferably, at least part of the recess 54 has a concave curved profile when viewed in longitudinal cross-section, and preferably this concave curved profile is provided by the recess fillet 58.

Preferably, the inner body corner 74 is located radially outward of and encircles the relatively rotatable surface 6. The inner body corner 74 is preferably located more radially outward than the dynamic sealing surface 12, so it can be said that the radial location of at least part of the inner body corner 74 is more radially outward than the radial location of the dynamic sealing surface 12. Preferably, at least a portion of the inner body corner 74 contacts and is supported by the first groove wall 18 when the pressure of the second fluid 10 is greater than the pressure of the first fluid 8.

At least part of the recess 54 is recessed (i.e., indented) relative to the dynamic sealing surface 12, and is preferably adapted to form a hydrodynamic inlet, and be exposed to the lubricant of a lubricant supply (i.e., the first fluid 8). Preferably, at least a portion of the recess 54 has a sloping profile in the circumferential direction forming a smooth transition with the dynamic sealing surface 12 in the circumferential direction. This sloping profile is preferably adapted to provide gradual convergence with the relatively rotatable surface 6 in the circumferential direction, for assisting the wedging of a film of the first fluid 8 into the dynamic sealing interface. If desired, this sloping profile may be curved (as shown in FIG. 1C).

When the recess 54 is compressed against the relatively rotatable surface 6, a circumferential end thereof produces a gradually converging relationship with the relatively rotatable surface 6 in the circumferential direction, preferably forming a hydrodynamic entrance zone for the efficient introduction of a film of the first fluid 8 between the dynamic sealing surface 12 and the relatively rotatable surface 6 within the adjoining zone 38, in response to relative rotation between the dynamic sealing surface 12 and the relatively rotatable surface 6.

Running torque of the rotary seal 4 is influenced by the effectiveness of lubrication within the adjoining zone 38. The recess 54 preferably assists in effectively lubricating the adjoining zone 38, even when the pressure of the second fluid 10 is considerably greater than the pressure of the first fluid 8.

Rotary testing of the improved geometry of the present invention by the inventor and his associates has demonstrated that it allows the seal to operate at relatively high surface speeds when the pressure of the second fluid 10 is 1,000 psi greater than the pressure of the first fluid 8. For example, when the pressure of the second fluid 10 was 1,000 psi greater than the pressure of the first fluid 8, the rotary seal 4 was able to operate for extended periods of time at a surface speed of 494 surface feet per minute.

Description of FIG. 1B

FIG. 1B is a fragmentary cross-sectional view of the machine assembly 2 in an operating condition where the pressure of the first fluid 8 is greater than the pressure of the second fluid 10, creating a differential pressure over the area between the relatively rotatable surface 6 and the peripheral wall 28. The result is an axially-acting hydraulic force that preferably pushes the second seal end 26 of the rotary seal 4 into contact with the second groove wall 20, and preferably creates a gap between the first seal end 24 and the first groove wall 18. Preferably, the plastic liner 30 covers and bridges an extrusion gap clearance 75 between the first machine component 14 and the relatively rotatable surface 6 of the second machine component 22.

Description of FIG. 1C

FIG. 1C is an enlarged fragmentary shaded perspective view, showing a segment of the same generally circular rotary seal 4 that is shown in the other figures herein, and shows the rotary seal 4 in an uncompressed state. The segment of the rotary seal 4 that is illustrated in FIG. 1C represents one wave 64 of a repetitive hydrodynamic wave pattern that is located on the inner periphery of rotary seal 4. The wave 64 in FIG. 1C is illustrated as being a counter-clockwise wave. Preferably, clockwise waves are simply a mirror image of the geometry that is shown in FIG. 1C.

It should be understood that FIG. 1C shows a portion of the rotary seal 4, and that the complete rotary seal 4 incorporates a number of the described waves, with the number of waves being selected based on the diameter of the seal. Typically, a seal has an equal number of clockwise and counter-clockwise waves, but this is not a requirement. Configurations are possible where unequal numbers of clockwise and counter-clockwise waves are incorporated.

The first seal end 24, exclusionary intersection 44 and dynamic sealing surface 12 are labeled in FIG. 1C for orientation purposes. Dynamic sealing surface 12 preferably faces generally radially inward, and preferably faces generally away from the static sealing surface 36. The static sealing surface 36 is preferably a feature of a static sealing lip 60, in accordance with the teachings of commonly assigned U.S. Pat. No. 5,230,520. The static sealing lip 60 preferably projects radially outward from a body outer peripheral surface 62 that faces radially outward, in a direction generally opposite from the direction the dynamic sealing surface 12 faces.

The previously mentioned exclusion intersection 46 is preferably an intersection between the static sealing surface 36 and the second seal end 26, and preferably has abrupt circular form that is substantially aligned with the direction of relative rotation. The exclusion intersection 46 is typically located at a flash location, and it is well known in the art of rubber molding that flash locations may have a small amount of projecting flash, and may be a broken corner, such as a slightly chamfered or rounded corner, as a result of a flash trimming operation.

Preferably, the static sealing lip 60 is larger in diameter than the dynamic sealing surface 12, and larger in diameter than the body outer peripheral surface 62, and preferably the static sealing surface 36 faces generally radially outward. Preferably, the dynamic sealing surface 12 faces in a generally opposite direction from the static sealing surface 36, and is located radially inward from the static sealing surface 36.

The geometry of the static sealing lip 60 can take other forms without departing from the spirit or scope of the present invention. For example, any of the static lip forms shown in commonly assigned U.S. Pat. Nos. 5,230,520 and 6,767,016 could be employed if desired. The seal embodiment illustrated herein can also be simplified, if desired, by elimination of the projecting static sealing lip 60, such that the static sealing surface is formed by the body outer peripheral surface, as shown by commonly assigned U.S. Pat. No. 4,610,319.

The extension and dimension lines in FIG. 1C indicate the circumferential extent (i.e., circumferential length) of a seal segment that includes one complete hydrodynamic wave. Preferably, the wave 64 incorporates a recess 54.

The wave 64 incorporates a multi-function edge 66 that has a first edge end 70 and a second edge end 71 and preferably extends for the full circumferential extent of the wave 64. Preferably, the angular location of the first edge end 70 coincides with the angular location of the first circumferential wave end 68. Preferably, the angular location of the second edge end 71 coincides with the angular location of the second circumferential wave end 69.

Preferably, the multi-function edge 66 is convex and has a curved or curve-like profile when viewed in longitudinal cross-section. The ramp section 50 is a portion of the multi-function edge 66 that curves away from, and radially outward of, the level of the dynamic sealing surface 12. The portion of the ramp section 50 that is spaced the farthest away from the first circumferential wave end 68 and the farthest away from the first edge end 70 is preferably even with (level with) the dynamic sealing surface 12, and the remainder of the ramp section 50 is preferably recessed relative to the level of the dynamic sealing surface 12. Preferably, the ramp section 50 of the multi-function edge 66 is more axially distant from the exclusionary intersection 44 (and from the second seal end 26), compared to the remaining portion of the multi-function edge 66.

Preferably, the recess flank 52 forms part of the recess 54, and the ramp section 50 also forms part of the recess 54. In other words, preferably the recess 54 is formed in part by the ramp section 50 of the multi-function edge 66 and in part by the recess flank 52. Preferably, the recess flank 52 forms part of a side of the recess 54 that is nearer to the exclusionary intersection 44 and the second seal end 26, and the ramp section 50 forms a part of a side of the recess 54 that is farther from the exclusionary intersection 44 and the second seal end 26. Preferably, the recess flank 52 forms part of a side of the recess 54 that is farther from the first seal end 24 and the ramp section 50 forms a part of a side of the recess 54 that is nearer to the first seal end 24.

Preferably, during periods of relative rotation, the recess flank 52 and the ramp section 50 form at least part of a hydrodynamic inlet for providing lubricant within the interface between the rotary seal 4 and the relatively rotatable surface 6 that is shown in FIG. 1A. The ramp section 50 is part of what controls the circumferential convergence of the recess 54 with the relatively rotatable surface 6 that is shown in FIG. 1A.

Preferably, the wave 64 includes a first circumferential wave end 68 and a second circumferential wave end 69, wherein the first circumferential wave end 68 is circumferentially spaced from the second circumferential wave end

69. The first circumferential wave end 68 is preferably also the first circumferential wave end of an oppositely-clocked mirror-image wave that is not shown in FIG. 1C; the first circumferential wave end 68 being a location where both waves share a common cross-sectional profile. The second circumferential wave end 69 is preferably also the second circumferential wave end of an oppositely-clocked mirror-image wave that is not shown in FIG. 1C; the second circumferential wave end 69 being a location where both waves share a common cross-sectional profile.

Preferably, most of the ramp section 50 is recessed relative to the level of the dynamic sealing surface 12. Preferably the ramp section 50 slopes relative to the dynamic sealing surface 12, the ramp section 50 sloping more radially outward of the level of the dynamic sealing surface 12 as the ramp section 50 becomes more distant from the second edge end 71, and closer to the first edge end 70.

If desired, the convex curve profile of at least a portion of the multi-function edge 66 can have a curvature size that varies along at least part of the circumferential length of the multi-function edge 66, the curve profile having less curvature (a looser curve) as the multi-function edge 66 comes nearer to the exclusionary intersection 44, and nearer to the second edge end 71, and nearer to the second circumferential wave end 69. If desired, the curvature size can vary sinusoidally. Preferably, the first edge end 70 of the multi-function edge 66 is more axially distant from the second seal end 26 compared to the second edge end 71 of the multi-function edge 66.

Preferably, at least a portion of the multi-function edge 66 forms a ramp section 50. Preferably, the multi-function edge 66 has an end portion that begins at the first edge end 70 and this end portion forms the ramp section 50. The ramp section 50 preferably extends in a generally circumferential direction, and is preferably skewed with respect to the exclusionary intersection 44, and with respect to the first seal end 24, and with respect to the second seal end 26.

The recess 54 preferably incorporates a recess fillet 58 that has a generally concave curve or curve-like profile when viewed in longitudinal cross-section and has a sloping, inclined profile in the circumferential direction. Preferably, at least a portion of the recess fillet 58 is adjacent to and recessed relative to the ramp section 50 and recessed relative to the dynamic sealing surface 12. Preferably, at least a portion of the recess fillet 58 is located between the exclusionary intersection 44 and the ramp section 50.

Preferably, the recess flank 52 of the recess 54 has a generally convex curve-like profile (a generally convex curvature) when viewed in longitudinal cross-section. The size of the curve-like profile preferably varies along the circumferential length of the recess flank 52, the recess flank 52 becoming less curved as the recess flank 52 forms a smooth transition with and into the dynamic sealing surface 12 in the circumferential direction. In other words, preferably, the generally convex profile of the recess flank 52 varies in curvature between a first circumferential location and a second circumferential location—it has a variable curvature. Preferably, this variable curvature partially controls the circumferential convergence of the recess flank 52 with respect to the relatively rotatable surface 6 that is shown in FIG. 1A, when the seal is installed.

The recess fillet 58 is preferably tangent or substantially tangent to the recess flank 52. The recess fillet is also preferably tangent or substantially tangent to the ramp section 50. The curve-like cross-sectional profile of the recess flank 52, recess fillet 58 and ramp section 50 can take any suitable form, such as a radius or a portion of an elliptical curve, or a portion of a parabolic curve, a combination of curves, etc.

When used in this specification, the word "intermediate" has the ordinary dictionary meaning of, "occurring in the middle of a . . . series" (Merriam-Webster's Learner's Dictionary).

Preferably, the recess fillet 58 is located in intermediate relation to the first seal end 24 and the recess flank 52. Preferably, the recess fillet 58 is located in intermediate relation to the first seal end 24 and the dynamic sealing surface 12. Preferably, the recess fillet 58 is located in intermediate relation to the first seal end 24 and the exclusionary intersection 44. Preferably, the recess fillet 58 is located in intermediate relation to the first seal end 24 and the second seal end 26.

Preferably, the recess fillet 58 is located at least partially between, and in intermediate relation to the ramp section 50 and the recess flank 52. Preferably, the recess fillet 58 is located in intermediate relation to the ramp section 50 and the dynamic sealing surface 12. Preferably, the recess fillet 58 is located in intermediate relation to the ramp section 50 and the exclusionary intersection 44. Preferably, the recess fillet 58 is located in intermediate relation to the ramp section 50 and the second seal end 26. Preferably, the recess fillet 58 is located in intermediate relation to, adjoins, and is adjacent to the ramp section 50 and the recess flank 52.

Preferably, the recess fillet 58 has a curvature size that increases along at least part of the circumferential length of the wave 64, and along at least part of the circumferential length of the recess 54, the curvature becoming tighter nearer to the first circumferential wave end 68, and becoming looser farther from the first circumferential wave end 68. In other words, the recess fillet 58 preferably has a variable curvature. Preferably, when the rotary seal 4 is installed, the rate and extent of the variation of the variable curvature of the recess fillet 58 is part of what controls the circumferential convergence of the recess fillet 58 with respect to the relatively rotatable surface 6 that is shown in FIG. 1A.

Preferably, the recess flank 52 is located in intermediate relation to the first seal end 24 and the dynamic sealing surface 12. Preferably, the recess flank 52 is located in intermediate relation to the first seal end 24 and the exclusionary intersection 44. Preferably, the recess flank 52 is located in intermediate relation to the first seal end 24 and the second seal end 26. Preferably, the recess flank 52 is located in intermediate relation to (and axially between) the ramp section 50 and the dynamic sealing surface 12. Preferably, the recess flank 52 is located in intermediate relation to the ramp section 50 and the exclusionary intersection 44. Preferably, the recess flank 52 is located in intermediate relation to the ramp section 50 and the second seal end 26.

Referring briefly to the installed condition, when the rotary seal 4 is compressed against the relatively rotatable surface 6 that is shown in FIG. 1A, it is preferable that at least a part of the ramp section 50 is compressed against the relatively rotatable surface, and at least a part of the ramp section does not contact the relatively rotatable surface, and instead has clearance with the relatively rotatable surface. The ramp section preferably slopes/curves toward the relatively rotatable surface at a gentle slope to converge gradually with the relatively rotatable surface, and form a part of a hydrodynamic wedging geometry. In other words, part of the ramp section 50 is adapted to slope toward the relatively rotatable surface, and preferably, at least a part of the ramp section 50 is adapted to be compressed against the relatively rotatable surface. Another way of saying this is that the ramp section 50 of the multi-function edge 66 is preferably adapted to curve toward and into contact with the relatively rotatable surface.

Preferably, the ramp section 50 has a first circumferential ramp end (first ramp end 90) at the first edge end 70 and has a second circumferential ramp end (second ramp end 92) that is remote from the first edge end 70. Preferably, the first ramp end 90 is more distant from the second edge end 71, compared to the second ramp end 92. Preferably, the second ramp end 92 is located in intermediate location to the first edge end 70 and the second edge end 71. Preferably, a portion of the ramp section at the second ramp end 92 is level with the dynamic sealing surface 12, and a portion of the ramp section 50 slopes away from the level of the dynamic sealing surface 12 as it approaches the first ramp end 90. Preferably, the portion of the ramp section 50 that is located nearest to the first ramp end 90 is radially closer to the body outer peripheral surface 62, compared to the second ramp end 92, and compared to the multi-function edge 66 at the second edge end 71. Preferably, the portion of the ramp section 50 that is located at the first ramp end 90 is radially farthest from the axis of the rotary seal 4, compared to other parts of the multi-function edge 66, and compared to the dynamic sealing surface 12. Preferably, the surface of the ramp section 50 is located the most radially outward, and nearest to the static sealing surface 36, at the first ramp end 90. Preferably, the ramp section 50 of the multi-function edge 66 curves increasingly closer to the static sealing surface 36 as the ramp section 50 becomes more distant from the second edge end 71 of the multi-function edge 66 and becomes nearer to the first edge end 70.

Preferably, the first ramp end 90 is located axially farther from the exclusionary intersection 44 than the remainder of the ramp section 50, the first ramp end 90 preferably being recessed relative to the level of the dynamic sealing surface 12. The first ramp end 90 is preferably the most recessed part of the multi-function edge 66, relative to the level of the dynamic sealing surface 12. The dynamic sealing surface 12 is preferably generally cylindrical.

The multi-function edge 66 extends in a generally circumferential direction (i.e., it has a generally circumferential orientation), and preferably all or substantially all of the multi-function edge 66 is skewed with respect to the exclusionary intersection 44, and skewed with respect to the first seal end 24, and skewed with respect to the second seal end 26, and skewed with respect to the possible directions of relative rotation. The portion of the multi-function edge 66 that is located circumferentially between the ramp section 50 and the second edge end 71 is preferably tangent or substantially tangent to the dynamic sealing surface 12. Preferably, the skewed multi-function edge 66 produces a skewed elevated contact pressure zone with respect to the relatively rotatable surface that is shown in FIG. 1A.

The rotary seal 4 preferably has an angled flank 72 that faces toward and is exposed to the first fluid 8 that is shown in FIG. 1A. Preferably, the angled flank 72 is located in spaced relation with respect to the exclusionary intersection 44. Preferably, the angled flank 72 is located more radially outward than the dynamic sealing surface 12, and the dynamic sealing surface 12 is located more radially inward than the angled flank 72. Preferably, the angled flank 72 is located between a portion of the multi-function edge 66 and a portion of the first seal end 24. The angled flank 72 is preferably tangent to the multi-function edge 66. Preferably, a portion of the multi-function edge 66 is located between and borders (i.e., is adjacent to) the angled flank 72 and the dynamic sealing surface 12. Preferably, a portion of the dynamic sealing surface 12 is located axially between and borders (i.e., is adjacent to) the exclusionary intersection 44 and the multi-function edge 66. Preferably, the angled flank 72 has a circumferential length, and the circumferential length of the angled flank 72 is less than (shorter than) the circumferential length of the wave 64. In other words, the angled flank 72 is preferably circumferentially discontinuous.

Volume 3 of William Audsley's 1881 book, the "Popular Dictionary of Architecture and the Allied Arts . . . " gives the definition of "Arris" as "The line on which two surfaces of any solid body forming an external angle meet together." Using this definition, the term "arris" is adopted herein to refer to specific circumferential portions of the inner body corner 74.

Preferably, the first seal end 24 is located next to and intersects and forms an inner body corner 74 with the angled flank 72 and a portion of the multi-function edge 66. In other words, preferably, the angled flank 72 is adjacent to and forms an intersection with the first seal end 24, and preferably, a portion of the multi-function edge 66 is adjacent to and forms an intersection with the first seal end 24. This inner body corner 74 is an external corner (i.e., an outside corner) that preferably includes a first arris 74A defined by and formed at the intersection of the first seal end 24 and a portion of the multi-function edge 66, and preferably includes a second arris 74B defined by and formed at the intersection of the first seal end 24 and the angled flank 72. The first arris 74A is preferably formed by an intersection of the first seal end 24 and the ramp section 50 of the multi-function edge 66. In other words, the first seal end 24 intersects and forms an outside corner with the angled flank 72 and the ramp section 50, this outside corner herein being referred to as the inner body corner 74. Another way of saying this is that preferably, at least a portion of the ramp section 50 is adjacent to and forms a first outside corner with the first seal end 24, and preferably, at least a portion of the angled flank 72 is adjacent to and forms a second outside corner the first seal end 24, the first and second outside corners being aligned to form a continuous radially undulating outside (external) corner that is identified herein as the inner body corner 74. The portion of the inner body corner 74 that is formed by an intersection between the angled flank 72 and the first seal end 24 is preferably an obtuse corner, the angled flank 72 and the first seal end 24 preferably being oriented at an obtuse angle with respect to one another.

Lest the reader be confused by terms such as external corner, outside corner, internal corner and inside corner, the inventor will provide an example. Imagine a large cube-shaped empty box made of opaque material. From a point of observation that is located inside the box, all of the corners that you can see are what are known in the engineering, manufacturing and building trades as internal corners, or inside corners. From a point of observation that is located outside the box, all you can see are what are known in the engineering, manufacturing and building trades as external corners, or outside corners. As a further clarification, a solid cube only has external (outside) corners, and has no inside (internal) corners.

Preferably, the first seal end 24 intersects the body outer peripheral surface 62 to form an outer body corner 76, which is an outside/external corner that is preferably generally circular. The inner body corner 74 and the outer body corner 76 are preferably sharp corners, as shown, but may be slightly rounded or chamfered, it being understood that perfectly formed sharp corners that exist in theory seldom, if ever, exist in actual manufactured products. For example, a machined external corner might have burrs from the manufacturing process, or may be slightly rounded or chamfered to remove such burrs.

Throughout its circumferential length, the inner body corner 74 is preferably axially equidistant from the second seal end 26, as shown, and preferably undulates in the radial direction. Because of the radial undulation of the inner body corner 74, some portions of the inner body corner 74 are located farther from, and more radially inward from, the outer body corner 76, compared to other portions of the inner body corner 74. As an example of the radial undulation of the inner body corner 74, a portion of the arris 74A is farther from the outer body corner 76, compared to the portion of the arris 74B that is located at an angular location corresponding with the angular location of the second circumferential wave end 69 and the second edge end 71. Preferably, the radial distance between the inner body corner 74 and the outer body corner 76 is greater at the angular location corresponding to the angular location of the first circumferential wave end 68 and the first edge end 70, compared to the radial distance between the inner body corner 74 and the and the outer body corner 76 at the angular location corresponding to the angular location of the second circumferential wave end 69 and the second edge end 71. Preferably, the multi-function edge 66 is skewed with respect to the axial position of the inner body corner 74, and this skew and the shape of the ramp section 50 are part of what produces the radial undulation of the inner body corner 74.

Preferably, the radial width of the first seal end 24 varies with the radial undulations of the inner body corner 74, as shown. Preferably, the edge of the first seal end 24 at the inner body corner 74 has a first concave portion at and near the first edge end 70, and has a second concave portion at and near the second edge end 71, and has a convex portion between the aforesaid first and second concave portions. This convex portion is along a portion of the first arris 74A that is formed by the intersection of the first seal end 24 and the ramp section 50 of the multi-function edge 66.

Preferably, the recess 54 is located in intermediate relation to the dynamic sealing surface 12 and the inner body corner 74. More specifically, the recess 54 is preferably located in intermediate relation to the dynamic sealing surface 12 and the first arris 74A that is formed by an intersection of the first seal end 24 and the ramp section 50 of the multi-function edge 66.

Preferably, the recess flank 52 is located in intermediate relation to the dynamic sealing surface 12 and the inner body corner 74. More specifically, the recess flank 52 is preferably located in intermediate relation to the dynamic sealing surface 12 and the first arris 74A that is formed by an intersection of the first seal end 24 and the ramp section 50 of the multi-function edge 66.

Preferably, the angled flank 72 is located in intermediate relation to the dynamic sealing surface 12 and the inner body corner 74. More specifically, the angled flank 72 is preferably located in intermediate location to the dynamic sealing surface 12 and the second arris 74B that is formed by the intersection of the first seal end 24 and the angled flank 72. Preferably, the angled flank 72 is located in intermediate relation to the multi-function edge 66 and the and the second arris 74B of the inner body corner 74.

Preferably, the angled flank 72 is located in intermediate relation to, adjoins, and is adjacent to the first seal end 24 and the multi-function edge 66. Preferably, the angled flank 72 is located in intermediate relation to the first seal end 24 and a portion of the dynamic sealing surface 12. Preferably, the angled flank 72 is located in intermediate relation to the first seal end 24 and the exclusionary intersection 44. Preferably, the angled flank 72 is located in intermediate relation to the first seal end 24 and the second seal end 26. Preferably, the angled flank 72 is located in spaced relation to the second seal end 26 and in spaced relation to the dynamic sealing surface 12.

Preferably, the angled flank 72 has an edge bordering the multi-function edge 66 that is skewed with respect to the first seal end 24 and with respect to the second seal end 26. The angled flank 72 preferably has less circumferential length, compared to the circumferential length of the wave 64. The angled flank 72 adjoins and preferably is adjacent to the first seal end 24.

The angled flank 72 is preferably located in intermediate relation to the inner body corner 74 and the multi-function edge 66. The angled flank 72 is preferably located in intermediate relation to the inner body corner 74 and the dynamic sealing surface 12. The angled flank 72 is preferably located in intermediate relation to the inner body corner 74 and the exclusionary intersection 44. The angled flank 72 is preferably located in intermediate relation to the inner body corner 74 and the second seal end 26.

Preferably, the ramp section 50 of the multi-function edge 66 is located in intermediate relation to the recess flank 52 and the inner body corner 74. More specifically, the ramp section 50 of the multi-function edge 66 is preferably located in intermediate relation to the recess flank 52 and the first arris 74A that is formed by an intersection of the first seal end 24 and the ramp section 50 of the multi-function edge 66. The ramp section 50 is preferably adjacent to, adjoins, and abuts the first seal end 24.

Preferably, the recess fillet 58 is located in intermediate relation to the recess flank 52 and the inner body corner 74. More specifically, the recess fillet 58 is preferably located in intermediate relation relative to the recess flank 52 and the first arris 74A that is formed by an intersection of the first seal end 24 and the ramp section 50 of the multi-function edge 66.

Preferably, the first arris 74A that is formed by an intersection of the first seal end 24 and the ramp section 50 of the multi-function edge 66 is located more radially outward than the dynamic sealing surface 12. Preferably, the second arris 74B formed by the intersection of the first seal end 24 and the angled flank 72 is located more radially outward than the dynamic sealing surface 12. Preferably, the entire inner body corner 74 is located more radially outward than the dynamic sealing surface 12.

The second arris 74B formed by the intersection of the first seal end 24 and the angled flank 72 has a first circumferential end that is nearest to the first edge end 70, and has a second circumferential end that is farthest from the first edge end 70, and the second circumferential end is preferably located more radially outward compared to the first circumferential end, and preferably, the inner periphery of the first seal end 24 is concave along the aforementioned second arris 74B, between the first and second circumferential ends of the second arris 74B.

The first arris 74A that is formed by an intersection of the first seal end 24 and the ramp section 50 of the multi-function edge 66 has a first circumferential end that is nearest to the first edge end 70 and farthest from the second edge end 71, and has a second circumferential end that is farthest from the first edge end 70 and farthest from the second edge end 71, and preferably, most of the inner periphery of the first seal end 24 is convex along the aforementioned first arris 74A, between the first and second circumferential ends of the first arris 74A.

A wave, such as a wave on a body of water, has a crest and two troughs. The wave 64 of rotary seal 4 is likewise a wavy shape having a crest and two troughs. A first trough is formed at the first circumferential wave end 68 by the recess flank 52, and a second trough is formed by the location where the multi-function edge 66 approaches closest to the exclusionary intersection 44 at the second edge end 71. The crest of the wave 64 is formed by the ramp section 50 of the multi-function edge 66 that is located at the first edge end 70. To a certain extent, this complex wave shape resembles the cross-section of an ocean wave that is commencing the cresting process. As with a cresting wave formed on a body of water, the crest formed by the ramp section 50 preferably overhangs the trough formed by the recess flank 52. The two troughs of wave 64 are axially narrower than the single crest of wave 64.

The recess 54 preferably has a smooth blended transition with the dynamic sealing surface 12. Another way of saying this is that the recess flank 52 and the recess fillet 58 preferably form a smooth blended transition to at least part of the dynamic sealing surface 12, forming part of a hydrodynamic inlet for lubricating the dynamic sealing interface during periods of relative rotation between the rotary seal 4 and the relatively rotatable surface 6 that is shown in FIG. 1A. Preferably, the recess 54 has one or more surfaces that are recessed (indented) relative the dynamic sealing surface 12, such that the recess 54 is located more radially outward, compared to the radial location of the dynamic sealing surface 12.

Preferably, a portion of the recess 54 is recessed (indented) relative to the ramp section 50. Specifically, the recess fillet 58 is preferably recessed relative to the ramp section 50, such that at any angular location along the circumferential length of the recess 54 (i.e., at any longitudinal cross-section along the circumferential length of the recess 54), the recess fillet 58 is located more radially outward, compared to the radial location of the ramp section 50. Specifically, the recess fillet 58 is preferably recessed relative to the ramp section 50, such that at any angular location along the circumferential length of the recess 54 (i.e., at any longitudinal cross-section along the circumferential length of the recess 54), the recess fillet 58 is located more radially outward, compared to the radial location of the ramp section 50.

Preferably, a portion of the recess 54 is recessed (indented) relative to the recess flank 52. Specifically, the recess fillet 58 is preferably recessed relative to the recess flank 52, such that at any angular location along the circumferential length of the recess 54 (i.e., at any longitudinal cross-section along the circumferential length of the recess 54), the recess fillet 58 is located more radially outward, compared to the radial location of the recess flank 52.

Preferably, the recess flank 52 is substantially tangent with the dynamic sealing surface 12 when viewed in longitudinal cross-section, and preferably, the recess flank 52 merges smoothly with and into the dynamic sealing surface 12 in the circumferential direction. In practice, the curvature of the recess flank 52 preferably varies along the circumferential length of the recess 54, being the tightest curve at a longitudinal cross-section coinciding with the first circumferential wave end 68, and becoming an increasingly looser curve at longitudinal cross-sections that are increasingly farther from the first circumferential wave end 68. At the circumferential end of the recess 54 that is most distant front the first circumferential wave end 68, the curvature preferably reaches or approaches infinity (a straight line) as the recess flank 54 merges smoothly into the dynamic sealing surface 12.

Preferably, the recess fillet 58 is substantially tangent with the ramp section 50 and with the recess flank 52 when viewed in longitudinal cross-section, and preferably, the recess fillet 58 merges smoothly with and into the dynamic sealing surface 12 in the circumferential direction. In practice, the curvature of the recess fillet 58 preferably varies along the circumferential length of the recess 54, being the tightest curve at a longitudinal cross-section coinciding with the first circumferential wave end 68, and becoming an increasingly looser curve at longitudinal cross-sections that are increasingly farther from the first circumferential wave end 68. At the circumferential end of the recess 54 that is most distant from the first circumferential wave end 68, the curvature preferably reaches or approaches infinity (a straight line) as the recess fillet 58 merges smoothly into the dynamic sealing surface 12. The recess fillet 58 is preferably skewed relative to the first seal end 24, the second seal end 26, and the exclusionary intersection 44.

Preferably, a line of substantial tangency is located along at least part of the multi-function edge 66, at least part of the line of substantial tangency being a location of substantial tangency between the multi-function edge 66 and the dynamic sealing surface 12 and at least a part of the line of substantial tangency being a location of substantial tangency between the multi-function edge 66 and the recess fillet 58.

It should be understood that FIG. 1C is a representative segment of an annular seal, showing one wave of an annular seal that typically has more than one wave. For bi-directional rotation service (clockwise and counter-clockwise), the rotary seal 4 should incorporate at least one wave 64 as shown, and at least one that is opposite (i.e. mirror image).

One edge of the angled flank 72 is preferably skewed with respect to the following items: the exclusionary intersection 44, the second seal end 26, the first seal end 24, and the possible directions of relative rotation between the rotary seal 4 and the relatively rotatable surface 6 that is shown in FIG. 1A. Another edge of the angled flank 72 is preferably substantially aligned (i.e., substantially parallel) with respect to the following items: the exclusionary intersection 44, the second seal end 26, the first seal end 24, and the possible directions of relative rotation between the rotary seal 4 and the relatively rotatable surface 6 that is shown in FIG. 1A. The edge of the angled flank 72 that is described above as being preferably skewed is the edge that is adjacent to the multi-function edge 66. The edge of the angled flank 72 that is described above as being substantially aligned is the edge that is adjacent to the first seal end 24; i.e. the edge that coincides with the second arris 74B that is created by the intersection of the angled flank 72 and the first seal end 24.

The first arris 74A that is formed by the intersection between the ramp section 50 and the first seal end 24 preferably causes a corresponding edge of the ramp section 50 to be substantially aligned (i.e., substantially parallel) with respect to the following items: the exclusionary intersection 44, the second seal end 26, the first seal end 24, and the possible directions of relative rotation between the rotary seal 4 and the relatively rotatable surface 6 that is shown in FIG. 1A.

The "swept zone" is a term of art that is defined by commonly assigned U.S. Pat. No. 9,121,504. The wave 64 is adapted for hydrodynamic self-lubrication within its swept zone with a film of the first fluid that identified in FIG. 1A in response to clockwise or counter-clockwise relative rotation between the rotary seal 4 and the relatively rotatable surface that is shown in FIG. 1A. The ability of the wave 64 to lubricate the swept zone in both directions of rotation is part of the original basis for the name "multi-function edge."

In response to counter-clockwise relative rotation between the rotary seal 4 and the relatively rotatable surface 6 that is shown in FIG. 1A, the wave 64 is preferably adapted for diverting a film of the first fluid 8 that is shown in FIG. 1A toward the second seal end 26 and into the second fluid 10 that is shown in FIG. 1A, and thereby provides for hydrodynamically lubricating the dynamic sealing interface during clockwise relative rotation.

In response to counter-clockwise relative rotation between rotary seal 4 and the relatively rotatable surface 6 that is shown in FIG. 1A, a mirror image of the wave 64 would preferably be adapted for diverting a film of the first fluid 8 that is shown in FIG. 1A toward the second seal end 26 and into the second fluid 10 that is shown in FIG. 1A, thereby providing for hydrodynamically lubricating the dynamic sealing interface during counter-clockwise relative rotation.

By employing at least one wave 64 as shown and at least one wave that is a mirror image of the wave 64, the rotary seal 4 is bi-directional in the sense that it achieves efficient hydrodynamic lubrication in response to either clockwise or counter-clockwise relative rotation.

The exact number of clockwise and counter-clockwise waves that are employed is dependent on the diameter of the rotary seal 4. Larger seals require more waves to be used—typically in a repetitive pattern. In extremely small diameter seals for bi-directional rotation, as few as one clockwise wave and one counter-clockwise wave might be employed. Although there is little incentive to do so, it is possible to design seals using this general wave pattern that have only one wave, or have differing numbers of clockwise and counter-clockwise waves, or only have clockwise waves, or only have counter-clockwise waves.

The angled flank 72 is preferably adjacent to the multi-function edge 66. Preferably, the multi-function edge 66 has at least a portion thereof that is skewed (i.e., not parallel) with respect to the direction of possible relative rotation, the directions of possible relative rotation being substantially aligned with the exclusionary intersection 44. Preferably, nearly all of the multi-function edge 66 is skewed with respect to the possible directions of relative rotation and skewed with respect to the exclusionary intersection 44. Preferably, as a result of the skewed nature of the multi-function edge 66, the multi-function edge 66 varies in position relative to exclusionary intersection 44 along the circumferential length of the multi-function edge 66.

Preferably, the multi-function edge 66 is located in intermediate relation to the inner body corner 74 and the dynamic sealing surface 12. Preferably, the multi-function edge 66 is located in intermediate relation to the first seal end 24 and the dynamic sealing surface 12. Preferably, the multi-function edge 66 is located in intermediate relation to the first seal end 24 and the exclusionary intersection 44. Preferably, the multi-function edge 66 is located in intermediate relation to the first seal end 24 and the second seal end 26. The ramp section 50 of the multi-function edge 66 preferably adjoins and abuts the first seal end 24, and is preferably truncated by the first seal end 24. Preferably, a portion of the multi-function edge 66 is located in intermediate relation to, adjoins, and abuts the angled flank 72 and the dynamic sealing surface 12. Preferably, a portion of the multi-function edge 66 is located in intermediate relation to the angled flank 72 and the exclusionary intersection 44. Preferably, a portion of the multi-function edge 66 is located in intermediate relation to the angled flank 72 and the second seal end 26.

Preferably, a portion of the multi-function edge 66 is located in intermediate relation to and adjoins and abuts the first seal end 24 and the recess fillet 58. A portion of the multi-function edge 66 is preferably located in intermediate relation to the first seal end 24 and the recess flank 52. Preferably, the multi-function edge 66 has a generally convex curve-like profile when viewed in longitudinal cross-section. As shown in FIG. 1C, if desired, the curvature of the curve-like profile can change along the circumferential length of the multi-function edge 66, becoming a looser curve as the multi-function edge 66 approaches nearer to the exclusionary intersection 44. For example, the curse can be lighter near the first edge end 70, and become looser toward the second edge end 71, and can become loosest at the second edge end 71.

A portion of the dynamic sealing surface 12 is preferably located in intermediate relation to the second seal end 26 and the recess flank 52. A portion of the dynamic sealing surface 12 is preferably located in intermediate relation to the second seal end 26 and the recess fillet 58. Preferably at least a portion of the dynamic sealing surface 12 is located in intermediate relation to the second seal end 26 and the multi-function edge 66. The dynamic sealing surface 12 is preferably located in intermediate relation to the second seal end 26 and the first seal end 24. Preferably, the dynamic sealing surface 12 is located in intermediate relation to the exclusionary intersection 44 and the inner body corner 74.

A portion of the dynamic sealing surface 12 is preferably located in intermediate relation to the exclusionary intersection 44 and the recess flank 52. A portion of the dynamic sealing surface 12 is preferably located in intermediate relation to the exclusionary intersection 44 and the recess fillet 58. Preferably, at least a portion of the dynamic sealing surface 12 is located in intermediate relation to the exclusionary intersection 44 and the multi-function edge 66. The dynamic sealing surface 12 is preferably located in intermediate relation to the exclusionary intersection 44 and the first seal end 24. The dynamic sealing surface 12 preferably terminates at the exclusionary intersection 44. The exclusionary intersection 44 is preferably located proximate to the second seal end 26, and may, if desired, be formed by an intersection between the dynamic sealing surface 12 and the second seal end 26. The exclusionary intersection 44 is shown in FIG. 1C as being formed by an intersection between the dynamic sealing surface 12 and a second liner end 83.

Preferably, at least a portion of the ramp section 50 is adjacent to and forms a first arris 74A with the first seal end 24, the first arris 74A being an outside (i.e., external) corner, and preferably being an obtuse corner that varies in angle along the circumferential length of the first arris 74A. In other words, preferably, the ramp section 50 is adjacent to forms an outside corner with the first seal end 24, the intersection angle 78 of the outside corner preferably being a variable obtuse angle.

The first arris 74A does not form an outside corner with the angled flank 72, but is preferably adjacent to and preferably abuts the second arris 74B. Together, the first arris 74A and the second arris 74B preferably join smoothly and seamlessly to form the inner body corner 74—the end of the first arris 74A that is farthest from the first edge end 70 (and closest to the second edge end 71) abutting the end of the second arris 74B that is closest to the first edge end 70 (and farthest from the second edge end 71).

Preferably, at least a portion of the angled flank 72 is adjacent to and forms a second arris 74B with the first seal end 24, the second arris 74B being an outside (i.e., external) corner, and preferably being an obtuse corner that varies in angle along the circumferential length of the second arris 74B. In other words, preferably, the angled flank 72 is adjacent to forms an outside corner with the first seal end 24, the angle of the outside corner preferably being a variable obtuse angle.

Preferably, the angled flank 72 is also angled with respect to the dynamic sealing surface 12, a flank angle being defined between the angled flank 72 and the dynamic sealing surface 12, and this flank angle may vary along the circumferential length of the angled flank 72, as the slope of the angled flank 72 varies.

Preferably, the second arris 74B formed by the angled flank 72 and the first seal end 24 is axially aligned with the first arris 74A formed by the ramp section 50 and the first seal end 24. The second arris 74B is preferably located between and adjoins the angled flank 72 and the first seal end 24, and the first arris 74A is preferably located between and adjoins the ramp section 50 and the first seal end 24.

The first arris 74A and the second arris 74B are located remote from (i.e., they are spaced from) the exclusionary intersection 44, and are preferably located remote from the recess flank 52, and are preferably located remote from the recess fillet 58. The first arris 74A and the second arris 74B are preferably separated from the second seal end 26 by the same axial distance. The first arris 74A and the second arris 74B are preferably separated from the exclusionary intersection 44 by the same axial distance. The first arris 74A and the second arris 74B are preferably parallel to the second seal end 26.

Preferably, the inner body corner 74, which includes the first arris 74A and the second arris 74B, is located radially more outward, relative to the radial location of the dynamic sealing surface 12 and relative to the radial location of the exclusionary intersection 44. Preferably, the angled flank 72 is located radially more outward, relative to the radial location of the dynamic sealing surface 12 and relative to the radial location of the exclusionary intersection 44.

Preferably, the first seal end 24 truncates the ramp section 50, and this truncation preferably produces the first arris 74A of the inner body corner 74. Preferably, the first seal end 24 truncates the angled flank 72, and preferably, this truncation produces the second arris 74B of the inner body corner 74. Preferably, the aforementioned truncation of the ramp section 50 and the angled flank 72 occurs as a result of using a machining operation to shorten a longer seal, and this machining operation produces the first seal end 24, and also produces the literal truncation of the ramp section 50 and the angled flank 72.

Preferably, the inner body corner 74 is left relatively sharp after the machining operation, but if desired, the inner body corner 74 can be "broken" by light chamfering or rounding. The sharp edges of many machined parts are "broken" after machining to remove burrs, etc., and many machining drawings carry a note something like "Break all sharp edges" and/or "Remove all burrs". Thus, it can be understood that the configuration of the preferably machined inner body corner 74 can be selected from the group consisting of sharp corners, rounded corners and chamfered corners. In this group, rounded corners and chamfered corners are normal types of "broken" corners; i.e., a normal corner treatment after a machining operation that is performed to break sharp edges slightly, and remove burrs.

The ramp section 50 is preferably located in intermediate relation to the inner body corner 74 and the dynamic sealing surface 12. The ramp section 50 is preferably located in intermediate relation to the inner body corner 74 and the exclusionary intersection 44. The ramp section 50 is preferably located in intermediate relation to the inner body corner 74 and the second seal end 26. The ramp section 50 is preferably located in intermediate relation to the inner body corner 74 and the recess fillet 58. The ramp section 50 is preferably located in intermediate relation to the inner body corner 74 and the recess flank 52.

If desired, the rotary seal 4 of the present invention can be created by the simple method of machining one of the general type of prior art seals that is shown and claimed by commonly assigned U.S. Pat. Nos. 7,562,878, 8,056,904 and 9,086,151. The required machining shortens the axial length of the prior art seal, and creates the unique geometry of the present invention, truncating the as-molded shape to create the novel truncated angled flank 72 and truncated ramp section 50 of the present invention—and a seal that has greater ability to handle differential pressure acting from the second seal end 26 toward the first seal end 24, compared to the prior art seals.

It can be appreciated that one result of creating the present invention through shortening the prior art seals (represented by U.S. Pat. Nos. 7,562,878, 8,056,904 and 9,086,151) by machining is to increase the projected area of the lubricant end of the seal. Specifically, the first seal end 24 of the present invention (i.e., the lubricant end) has more projected area compared to the lubricant end of the prior art seal that the present invention can be machined from. When differential pressure acts on the second seal end 26 and creates an axially-acting hydraulic force that is reacted by contact between the first seal end 14 and the first groove wall 18 that is shown in FIG. 1A, the ratio of the projected area of the second seal end 26 divided by the projected area of the first seal end 24 influences the magnitude of interfacial contact pressure between the rotary seal 4 and the relatively rotatable surface 6 that is shown in FIG. 1A. By increasing the area of the first seal end 24, one reduces the aforementioned area ratio, and the magnitude of the aforementioned interfacial contact pressure is reduced, improving the high pressure rotary performance of the seal.

When installed, the dynamic sealing surface 12 adjoins the relatively rotatable surface 6 that is shown in FIG. 1A, and is radially supported by that relatively rotatable surface. It can be appreciated that one result of shortening the prior art seal by machining is to shorten the axial distance separating the dynamic sealing surface 12 from the lubricant end of the seal. Specifically, the dynamic sealing surface 12 of the present invention is axially closer to the first seal end 24 (i.e., the lubricant end), compared to the axial distance separating the dynamic sealing surface 51 from the first seal end 14 (the lubricant end) of the seal represented by U.S. Pat. Nos. 7,562,878, 8,056,904 and 9,086,151. In the present invention, when the pressure of the second fluid 10 that is shown in FIG. 1A is greater than the pressure of the first fluid 8 that is shown in FIG. 1A, the pressure of the second fluid 10 acts through the elastomeric energizer 32 as if the elastomeric energizer 32 were a fluid. This imparts a radially inward-acting force that is reacted by the dynamic sealing surface 12 contacting the relatively rotatable surface 6 that is shown in FIG. 1A. The present invention is based in part on the theory that the shorter the axial distance between the dynamic sealing surface 12 of the present invention and the first seal end 24, the less the magnitude of interfacial contact pressure between the rotary seal 4 and the relatively rotatable surface 6 that is shown in FIG. 1A, and the better the dynamic performance of the rotary seal 4. Testing performed by the inventor and his associates confirms this theory.

The aforementioned radially inward-acting force tends to flatten critical geometry features toward or even against the relatively rotatable surface 6 that is shown in FIG. 1A, which reduces or eliminates the hydrodynamic rotary performance of a rotary seal. Examples of these critical geometry features include the recess flank 52, the recess fillet 58, the multi-function edge 66 and the angled flank 72. By minimizing the axial distance separating the dynamic sealing surface 12 from the first seal end 24, the total amount of radially inwardly-acting force is reduced, which reduces the deformation of the aforementioned critical geometry features, allowing the seal to withstand greater differential pressure while still operating hydrodynamically. Also, by minimizing the axial distance separating the dynamic sealing surface 12 from the first seal end 24, the portion of the rotary seal 4 that is located axially between the dynamic sealing surface 12 and the first seal end 24 effectively becomes stiffer, and thus better able to resist the aforementioned radially inwardly-acting force. In other words, by minimizing the axial distance separating the dynamic sealing surface 12 from the first seal end 24, there is less differential pressure-induced flattening of the recess flank 52, the recess fillet 58, the multi-function edge 66 and the angled flank 72.

The second arris 74B is at a corner created by the intersection between the first seal end 24 and the angled flank 72, the first seal end 24 truncating the angled flank 72. The intersection between the first seal end 24 and the angled flank 72 occurs at intersection angle 78. The intersection angle 78 preferably varies along the circumferential length of the angled flank 72, the intersection angle 78 being greatest at the angular location corresponding to the angle of the second circumferential wave end 69 and the second edge end 71, and being least at the circumferential end of the angled flank 72 that is most distant from the second circumferential wave end 69 and the second edge end 71. Another way of saying this is that the intersection angle 78 preferably varies along the circumferential length of the angled flank 72, the intersection angle 78 being least at the end of the angled flank 72 that is closest to the first edge end 70, and the intersection angle 78 being greatest at the end of the angled flank 72 that coincides with the second edge end 71.

The variable nature of the intersection angle 78 helps to increase the surface area of the first seal end 24, which as described above, has an influence on interfacial contact pressure that occurs between the dynamic sealing surface 12 and the relatively rotatable surface that is shown in FIG. 1A.

If desired, the axial distance between the exclusion intersection 46 and the outer body corner 76 could be greater than the axial distance between the exclusionary intersection 44 and the inner body corner 74, such that the first seal end 24 is conical or some other shape, and not parallel to the second seal end 26. In such cases, the first groove wall 18 that is shown in FIG. 1A would preferably have a matching shape, to support the first seal end 24 when the pressure of the first fluid 8 is greater than the pressure of the second fluid 10. Nevertheless, it is preferred that the first seal end 24 be substantially planar. It is also preferred that the second seal end 26 be substantially planar.

Description of FIG. 1D

FIG. 1D is an enlarged fragmentary shaded perspective view, showing a segment of the same generally circular rotary seal 4 that is shown in the other figures herein. FIG. 1D shows a segment of the rotary seal 4 in the uncompressed state, and the illustrated segment includes two oppositely clocked hydrodynamic waves that are preferably mirror images of one another. The mirroring plane is the longitudinal cross-section that is located at the first circumferential wave end 68 of the clockwise and counter-clockwise waves. The counter-clockwise wave that is illustrated by FIG. 1C is shown on the right side in FIG. 1D, and the mirror-image clockwise wave is shown on the left side of FIG. 1D. It should be understood that the complete rotary seal is created by replicating and circumferentially distributing segments that abut one-another to form a complete rotary seal 4.

For identification and orientation purposes, the dynamic sealing surface 12, second seal end 26, plastic liner 30, elastomeric energizer 32, static sealing surface 36, exclusionary intersection 44, exclusion intersection 46, static sealing lip 60, body outer peripheral surface 62 and outer body corner 76 are labeled. The ramp section 50, recess flank 52, recess 54, recess fillet 58, multi-function edge 66, second circumferential wave end 69, second edge end 71, angled flank 72 and inner body corner 74 of each wave are also labeled for identification and orientation purposes.

The clockwise and counter-clockwise waves that are illustrated in FIG. 1D meet (abut) at their respective first circumferential wave ends 68. On each wave that is shown by FIG. 1D), the first circumferential wave end 68 is circumferentially spaced from the second circumferential wave end 69 of that wave, as shown.

Since the clockwise wave and the counter-clockwise wave are illustrated and described as preferably being mirror images of one another, it logically follows that various features of the waves, such as the ramp section 50, the recess flank 52, the recess 54, the recess fillet 58, the multi-function edge 66, the angled flank 72 and the inner body corner 74 are also mirror images of one another—as indeed FIG. 1D shows them to be.

Preferably, the ramp section 50 of the clockwise wave is located in abutting relation with the ramp section 50 of the counter-clockwise wave at a shared first edge end 70, as shown. Preferably, the recess flank 52 of the clockwise wave is located in abutting relation with the recess flank 52 of the counter-clockwise wave, as shown. Preferably, the recess fillet 58 of the clockwise wave is located in abutting relation with the recess fillet 58 of the counter-clockwise wave, as shown.

The recess flank 52 of the clockwise wave preferably shares a common cross-sectional profile with the recess flank 52 of the counter-clockwise wave at the first circumferential wave end 68 (the abutting location), as shown. Preferably, the recess fillet 58 of the clockwise wave shares a common cross-sectional profile with the recess fillet 58 of the counter-clockwise wave at the first circumferential wave end 68 (the abutting location), as shown. The ramp section 50 of the clockwise wave preferably shares a common cross-sectional profile with the ramp section 50 of the counter-clockwise wave at the first edge end 70, as shown.

Preferably, the skewed portion of the multi-function edge 66 of the clockwise wave is skewed oppositely from the skewed portion of the multi-function edge 66 of the counter-clockwise wave, as shown. Preferably, the recess fillet 58 of the clockwise wave is oppositely-skewed to the recess fillet 58 of the counter-clockwise wave, as shown.

Preferably, the end of the angled flank 72 of the clockwise wave that is nearest to the first edge end 70 of the clockwise and counter-clockwise multi-function edges is circumferentially separated from, and is not located in abutting relation with, the end of the angled flank 72 of the counter-clockwise wave that is nearest to the first edge end 70 of the clockwise and counter-clockwise multi-function edges. In other words, preferably, the angled flank 72 is circumferentially discontinuous.

As shown in FIG. 1D, the recess 54 of the clockwise wave and the recess 54 of the counter-clockwise wave may meet to form a generally circumferentially oriented elongated recessed region 80 having a first circumferential end formed by tire recess 54 of the clockwise wave, and having a second circumferential end formed by the recess 54 of the counter-clockwise wave. The elongated recessed region 80 can have one side formed by the ramp sections 50 of the clockwise and counter-clockwise waves, and can have another side formed by the recess flanks 52 of the clockwise and counter-clockwise waves. As further shown in FIG. 1D, the elongated recessed region 80 can have a concave bottom portion that is formed by the recess fillets 58 of the clockwise and counter-clockwise waves.

Referring to FIG. 1D, the elongated recessed region 80 is recessed (indented) relative to the dynamic sealing surface 12. At any given longitudinal cross-section along the circumferential length of the elongated recessed region 80, the elongated recessed region 80 is located radially outward from the radial location of the dynamic sealing surface 12.

As can be seen in FIG. 1D, the elongated recessed region 80 can have a first sloping profile in a first circumferential direction, the first sloping profile gradually blending into the dynamic sealing surface 12 in the first circumferential direction; and can have a second sloping profile in a second (i.e., opposite) circumferential direction, the second sloping profile gradually blending into the dynamic sealing surface 12 in the second circumferential direction.

As can be seen in FIG. 1D, the ramp section 50 and the angled flank 72 of the clockwise wave are truncated at the inner body corner 74 of the clockwise wave, and the ramp section 50 and the angled flank 72 of the counter-clockwise wave are truncated at the inner body corner 74 of the counter-clockwise wave.

As can be seen in FIG. 1D, the inner body corner 74 of the clockwise wave and the inner body corner 74 of the counter-clockwise wave are preferably mirror images of one-another. The inner body corner 74 of the clockwise wave and the inner body corner 74 of the counter-clockwise wave preferably meet and abut and are aligned with one-another at the angular location where the clockwise and counter-clockwise waves abut at their shared first circumferential wave end 68 (i.e., where the clockwise and counter-clockwise multi-function edges meet at their shared first edge end 70). Although the first seal end is not labeled in FIG. 1D, one can see that the inner peripheral edge of the first seal end coincides with the inner body corner 74 of the clockwise wave and the inner body corner 74 of the counter-clockwise wave, and one can see that at an angular location corresponding to the shared first circumferential wave end 68 of the clockwise and counter-clockwise waves, where the inner body corner 74 of the clockwise wave meets the inner body corner 74 of the counter-clockwise wave, the inner peripheral edge of the first seal end is concave. As shown, the angular location of the shared first circumferential wave end 68 of the clockwise and counter-clockwise waves preferably corresponds to the angular location of the shared first edge end 70 of the clock wise and counter-clockwise multi-function edges 66.

Borrowing an aeronautical engineering term that is based on the bent shape of the wings of a seagull, one can see that, together, the inner body corner 74 of the clockwise and the counter-clockwise waves preferably form what can be referred to as a "gull wing" shape. A good example of the "gull wing" shape is provided by the wings of the Habicht aerobatic sailplane that was manufactured by Deutsche Forschungsanstalt für Segelflug. The term "gull wing" has also been adopted and used to describe other manufactured products. For example, it is used to describe automobile doors that are hinged at the roof, such as the doors on the Mercedes-Benz 300 SL. The term "gull wing shape" is used in this specification to describe the preferred combined shape of the inner body corner 74 of the clockwise wave and inner body corner 74 of the counter-clockwise wave, when the clockwise and counter-clockwise waves abut at their shared first circumferential wave end 68.

Description of FIG. 1E

FIG. 1E is an enlarged fragmentary shaded perspective view, showing a segment of the same generally circular rotary seal 4 that is shown in the other figures herein. FIG. 1E shows a segment of the rotary seal 4 in the uncompressed state, and the illustrated segment includes two oppositely clocked hydrodynamic waves that preferably are mirror images of one another. The mirroring plane is the longitudinal cross-section that is located at an angle corresponding to the second circumferential wave end 69. The counter-clockwise wave that is illustrated by FIG. 1C is shown on the left side in FIG. 1E, and the mirror-image clockwise wave is shown on the right side of FIG. 1E. It should be understood that the complete rotary seal is created by replicating segments and circumferentially distributing segments that abut one-another to form a complete rotary seal 4.

For identification and orientation purposes, the dynamic sealing surface 12, first seal end 24, second seal end 26, plastic liner 30, elastomeric energizer 32, static sealing surface 36, exclusionary intersection 44, exclusion intersection 46, static sealing lip 60, body outer peripheral surface 62 and outer body corner 76 are labeled. The ramp section 50, recess flank 52, recess 54, recess fillet 58, multi-function edge 66, first circumferential wave end 68, first edge end 70, second edge end 71, angled flank 72 and inner body corner 74 of each wave are also labeled for identification and orientation purposes.

The clockwise and counter-clockwise weaves that are illustrated in FIG. 1E meet (abut) at a shared second circumferential wave end 69. On each wave that is shown by FIG. 1E, the first circumferential wave end 68 is circumferentially spaced from the second circumferential wave end 69 of that wave. As shown, the clockwise wave smoothly transitions into the counter-clockwise wave at the shared second circumferential wave ends 69 of the clockwise and counter-clockwise waves. This is possible because the clockwise and counter-clockwise waves preferably are mirror images of one another.

Preferably, the multi-function edge 66 of the clockwise wave is located in abutting relation with the multi-function edge 66 of the counter-clockwise wave, as shown. Preferably, the angled flank 72 of the clockwise wave is located in abutting relation with the angled flank 72 of the counter-clockwise wave, as shown.

The multi-function edge 66 of the clockwise wave preferably shares a common cross-sectional profile with the multi-function edge 66 of the counter-clockwise wave at an angle corresponding to the location the second edge end 71 and the second circumferential wave end 69 (the abutting location), as shown. The angled flank 72 of the clockwise wave preferably shares a common cross-sectional profile with the angled flank 72 of the counter-clockwise wave at an angle corresponding to the location of the second edge end 71 and the second circumferential wave end 69 (the abutting location), as shown.

As can be seen in FIG. 1E, the ramp section 50 and the angled flank 72 of the clockwise wave are truncated by the first seal end 24 at the inner body corner 74 of the clockwise wave, and the ramp section 50 and the angled flank 72 of the counter-clockwise wave are truncated by the first seal end 24 at the inner body corner 74 of the counter-clockwise wave.

As can be seen in FIG. 1E, the inner body corner 74 of the clockwise wave and the inner body corner 74 of the counter-clockwise wave are preferably mirror images of one-another. The inner body corner 74 of the clockwise wave and the inner body corner 74 of the counter-clockwise wave preferably meet and abut and are aligned with one-another at the location where the clockwise and counter-clockwise waves abut at their respective second circumferential wave ends 69. The inner peripheral edge of the first seal end 24 coincides with the inner body corner 74 of the clockwise wave and the inner body corner 74 of the counter-clockwise wave, and one can see that at the angle corresponding to the angular location of the second edge end 71 of the clockwise and counter-clockwise multi-function edges 66 and the second circumferential wave end 69 of the clockwise and counter-clockwise waves. At the location where the inner body corner 74 of the clockwise wave meets the inner body corner 74 of the counter-clockwise wave, the inner peripheral edge of the first seal end 24 is concave.

Preferably, each ramp section 50 has a first ramp end 90 that coincides with the angular location of the first circumferential wave end 68, and has a second ramp end 92 that is located in intermediate relation to the first circumferential wave end 68 and the second circumferential wave end 69. Preferably, the first ramp end 90 is located more radially outward, closer to the static sealing surface 36 compared to the second ramp end 92. Preferably, the first ramp end 90 is recessed relative to the dynamic sealing surface 12, and preferably the second ramp end 92 is level with the dynamic sealing surface 12. Preferably, the ramp section 50 curves radially outward from the second ramp end 92, such that the ramp section 50 is increasingly recessed relative to the dynamic sealing surface 12 at locations closer to the first ramp end 90.

Description of FIG. 1F

FIG. 1F is an enlarged fragmentary longitudinal cross-sectional view of the same generally circular rotary seal 4 that is shown in the other figures herein. The cross-sectional view of FIG. 1F corresponds to the angular location of the first circumferential wave end 68 that is shown in FIGS. 1C, 1D and 1E, and like those figures, shows the rotary seal 4 in the uncompressed state. The cross-sectional view of FIG. 1F represents the same angular cross-sectional location on the rotary seal 4 that FIGS. 1A and 1B represent.

For identification and orientation purposes, the dynamic sealing surface 12, first seal end 24, second seal end 26, plastic liner 30, enlarged rim 34, elastomeric energizer 32, static sealing surface 36, exclusionary intersection 44, exclusion intersection 46, ramp section 50 of the multi-function edge, recess flank 52, recess 54, recess fillet 58, static sealing lip 60, body outer peripheral surface 62, inner body corner 74 and outer body corner 76 are labeled.

As shown in FIG. 1F, the ramp section 50 is truncated by the first seal end 24 at the inner body corner 74 and the plastic liner extends to the first seal end 24. This would be difficult and perhaps impossible to accomplish by molding, but can be accomplished through machining. The first seal end 24 is preferably formed by shortening a seal of the general type disclosed in commonly assigned U.S. Pat. Nos. 7,562,878, 8,056,904 and 9,086,151, using a machining-type material removal process. This means that the first liner end 82 and the inner body corner 74 of the plastic liner 30 are preferably produced by machining. If desired, the inner body corner 74 between the ramp section 50 and the first seal end 24 can be an obtuse angle, as shown. Optionally, the seal could be shortened a little more than shown, making the inner body corner 74 a right-angled or even slightly acute angle. The angle of the inner body corner 74 is not critical at this particular cross-sectional location of the rotary seal 4, because the ramp section 50 does not touch the mating relatively rotatable surface (that is shown in FIG. 1A) at the angular location of this cross-section (i.e., at the first circumferential wave end) due to the unique geometry of the seal 4 that makes the geometry more pressure-resistant.

Description of FIG. 1G

FIG. 1G is an enlarged fragmentary longitudinal cross-sectional view of the same generally circular rotary seal 4 that is shown in the other figures herein. The cross-sectional view of FIG. 1G corresponds to the angular location of the second circumferential wave end 69 that is shown in FIGS. 1C, 1D and 1E, and like those figures, shows the rotary seal 4 in the uncompressed state.

For identification and orientation purposes, the dynamic sealing surface 12, first seal end 24, second seal end 26, plastic liner 30, enlarged rim 34, elastomeric energizer 32, static sealing surface 36, exclusionary intersection 44, exclusion intersection 46, static sealing lip 60, body outer peripheral surface 62, multi-function edge 66, angled flank 72, inner body corner 74, outer body corner 76 and intersection angle 78 are labeled.

FIG. 1G shows the angled flank 72 truncated by the first seal end 24 at the inner body corner 74.

Description of FIG. 1H

FIG. 1H is an enlarged fragmentary longitudinal cross-sectional view of the same generally circular rotary seal 4 that is shown in the other figures herein, with the rotary seal 4 in the uncompressed state. The cross-sectional view of FIG. 1H was taken at an angular location that is approximately halfway along the circumferential length of the ramp section 50; i.e., about halfway along the circumferential length of the recess 54.

For identification and orientation purposes, the dynamic sealing surface 12, first seal end 24, second seal end 26, plastic liner 30, enlarged rim 34, elastomeric energizer 32, static sealing surface 36, exclusionary intersection 44, exclusion intersection 46, ramp section 50 of the multi-function edge, recess flank 52, recess 54, recess fillet 58, static sealing lip 60, body outer peripheral surface 62, inner body corner 74 and outer body corner 76 are labeled.

In comparison to the depiction of the recess flank 52 in FIG. 1F, the recess flank 52 is a looser curve in FIG. 1H. In comparison to the depiction of the recess 54 in FIG. 1F, the recess 54 in FIG. 1H is axially more distant from the first seal end 24, axially closer to the second seal end 26, more radially distant from the static sealing surface 36, and closer to the level of the dynamic sealing surface 12. In comparison to the depiction of the recess fillet 58 in FIG. 1F, in FIG. 1H the recess fillet 58 is axially more distant from the first seal end 24, axially closer to the second seal end 26, more radially distant from the static sealing surface 36, and closer to the level of the dynamic sealing surface 12. In comparison to the depiction of the recess fillet 58 in FIG. 1F, the recess fillet 58 is a looser curve in FIG. 1H. In comparison to the depiction of the ramp section 50 in FIG. 1F, the ramp section 50 in FIG. 1H is more radially distant from the static sealing surface 36, and closer to the level of the dynamic sealing surface 12. In comparison to the depiction of the inner body corner 74 in FIG. 1F, in FIG. 1H the inner body corner 74 is farther from the outer body corner 76, more radially distant from the static sealing surface 36, and closer to the level of the dynamic sealing surface 12. In comparison to the depiction of the first seal end 24 in FIG. 1F, the radial width of the first seal end 24 is greater in FIG. 1H.

Description of FIG. 1I

FIG. 1I is an enlarged fragmentary longitudinal cross-sectional view of the same generally circular rotary seal 4 that is shown in the other figures herein, with the rotary seal 4 in the uncompressed state. The cross-sectional view of FIG. 1H corresponds to an angular location that is approximately midway between the ramp section 50 and the second edge end 71 that are shown in FIGS. 1C, 1D and 1E. In other words, the cross-sectional view of FIG. 1I corresponds to an angular location that is approximately midway between the recess 54 and the second circumferential wave end 69 that are shown in FIGS. 1C, 1D and 1E.

For identification and orientation purposes, the dynamic sealing surface 12, first seal end 24, second seal end 26, plastic liner 30, enlarged rim 34, elastomeric energizer 32, static sealing surface 36, exclusionary intersection 44, exclusion intersection 46, multi-function edge 66, static sealing lip 60, body outer peripheral surface 62, angled flank 72, inner body corner 74 and outer body corner 76 are labeled.

In comparison to the depiction of the dynamic sealing surface 12 in FIG. 1G, in FIG. 1I the local width of the dynamic sealing surface 12 is axially greater (i.e., wider). In comparison to the depiction of the multi-function edge 66 in FIG. 1G, the multi-function edge 66 in FIG. 1I is axially more distant from the exclusionary intersection 44 and axially more distant from the second seal end 26. In comparison to the depiction of the multi-function edge 66 in FIG. 1G, the multi-function edge 66 is axially less distant from the inner body corner 74 and axially less distant from the first seal end 24 in FIG. 1I. In comparison to the depiction of the angled flank 72 in FIG. 1G, in FIG. 1I the angled flank 72 is narrower. In comparison to the depiction of the intersection angle 78 in FIG. 1G, in FIG. 1I the size of the intersection angle 78 is greater (this is an option, not a requirement).

Radially outward of the dynamic sealing surface 12, the liner outer surface 84 and the energizer inner surface 86 are preferably generally cylindrical. The rim outer surface 88 and the liner mating surface 89 are also preferably generally cylindrical. The plastic liner 30 preferably extends all the way to, and forms part of the second seal end 26, however, rotary testing at extreme differential pressures acting from the first seal end 24 has shown that a thin overlay of elastomer between the plastic liner 30 and the second seal end 26 is not harmful to dynamic performance of the rotary seal 4.

Description of FIG. 1J

FIG. 1J is an enlarged fragmentary view of the same generally circular rotary seal 4 that is shown in the other figures herein, and it depicts the rotary seal 4 in the uncompressed state. More specifically, FIG. 1J is a drawing of the same segment of the rotary seal 4 shown in FIG. 1D, and the line of sight (i.e., the angle of drafting projection) of the view is perpendicular to the first seal end 24. FIG. 1J shows a portion of the rotary seal 4 that includes one clockwise wave segment and one counter-clockwise wave segment.

For identification and orientation purposes, the dynamic sealing surface 12, static sealing surface 36, outer body corner 76, and first liner end 82 of the plastic liner 30 are labeled, as is the shared first circumferential wave end 68 of the clockwise and counter-clockwise waves and the shared first edge end 70 of the clockwise and counter-clock wise multi-function edges. The ramp section 50, recess flank 52, second circumferential wave end 69, angled flank 72, first arris 74A and second arris 74B of each wave are also labeled for identification and orientation purposes.

As previously stated, the inner body corner 74 preferably has a gull-wing shape. At the first seal end 24, the liner outer surface 84, which mates with the energizer inner surface 86, preferably has a gull-wing shape. The liner outer surface 84 is preferably integrally molded with and bonded to the energizer inner surface 86. The first liner end 82 also preferably has a gull-wing shape. At the first seal end 24, the energizer inner surface 86, which mates with the liner outer surface 84, preferably has a gull-wing shape. The static sealing surface 36 and the outer body corner 76 preferably have an annular and generally circular shape. The dynamic sealing surface 12 is preferably also annular and generally cylindrical.

Preferably, the end of second arris 74B that is farthest from the first circumferential wave end 68 and farthest from the first edge end 70 is radially closer to the outer body corner 76, compared to the end of second arris 74B that is closest to the first circumferential wave end 68 and closest to the first edge end 70. Preferably, the radial dimension of the first seal end 24 varies along the circumferential length of the clockwise and counter-clockwise waves. Preferably the narrowest radial width of the first seal end 24 occurs along the second arris 74B and is located at an angular location of the second edge end 71 and the second circumferential wave end 69, and preferably the greatest radial width (which can also be called radial depth) of the first seal end 24 occurs along the first arris 74A. More specifically, preferably the greatest radial width of the first seal end 24 occurs between the ends of the first arris 74A; i.e., between the ends of the ramp section 50. Also, preferably the location where the inner body corner 74 is most distant from the outer body corner 76 is between the ends of the first arris 74A. Preferably, the end of the first arris 74A that is most distant from the second circumferential wave end 69 and most distant from the second edge end 71 is radially nearer to the outer body corner 76, compared to the end of the first arris 74A that is closest to the second circumferential wave end 69 and closest to the second edge end 71.

Description of FIG. 1K

FIG. 1K is an enlarged fragmentary view showing a method whereby the rotary seal 4 of the present invention can be produced. FIG. 1K corresponds to the same angular location as FIGS. 1A, 1B and 1F, and shows the rotary seal 4 before and after a machining operation that produces the same preferred embodiment of the present invention that is illustrated in the other figures herein. A surface of the rotary seal 4 that is produced by a machining operation is represented by a phantom line. The machined surface represented by the phantom line is the first seal end 24.

A rotary seal 4 is provided that has preferably been formed by molding, and preferably defines the following features of the present invention: the dynamic sealing surface 12, second seal end 26, plastic liner 30, enlarged rim 34, elastomeric energizer 32, static sealing surface 36, exclusionary intersection 44, exclusion intersection 46, ramp section 50 of the multi-function edge, recess flank 52, recess 54, recess fillet 58, static sealing lip 60 and body outer peripheral surface 62. Preferably, the initial molded version of the rotary seal 4 has an original molded length 98, and the finished rotary seal 4 of the present invention has a machined length 100 that is shorter than the original molded length 98. If desired, the plastic liner 30 can be made without the enlarged rim 34.

The initial molded version of the rotary seal 4 preferably defines an original lubricant end 94 that faces in a generally axial direction, and generally away from and generally opposite to the direction the second seal end 26 faces. The initial molded version of the rotary seal 4 preferably also defines a body inner surface 96 that faces in a generally radially inward direction. The initial molded version of the rotary seal 4 preferably also defines an angled flank 72, and a portion of this angled flank 72 may be located in intermediate location to the body inner surface 96 and the ramp section 50, as shown, and preferably adjoins the body inner surface 96 and the ramp section 50, as shown. Preferably, the body inner surface 96 is located in intermediate relation to the original lubricant end 94 and the ramp section 50, and is located in intermediate relation to the original lubricant end 94 and the angled flank 72, and adjoins the original lubricant end 94 and the angled flank 72. It should be understood that the plastic liner 30 of the initial molded version of the rotary seal 4 would be very difficult and virtually impossible to extend all the way to the original lubricant end 94 because of deformation and rubber flow that occurs during the molding process. The initial molded version of the rotary seal 4 preferably also defines an inside corner 97 between the body inner surface 96 and the angled flank 72, and this inside corner 97 is typically wavy in the axial direction.

One preferred method of producing the rotary seal 4 of the present invention is to provide the molded seal described above, and shorten it by machining it from the original molded length 98 to the machined length 100, producing the first seal end 24 (shown by phantom line) by the machining process. This machining process also preferably produces the inner body corner 74 and the outer body corner 76 that are described in various places throughout this specification. The machining process preferably eliminates the original lubricant end 94 and the original body inner surface 96. The machining process preferably also eliminates a circumferential portion of the angled flank 72 that is located between the ramp section 50 and the original body inner surface 96. It should be understood that the machining process, and the first seal end 24 that the machining process produces, literally truncate the ramp section 50 of the multi-function edge and the angled flank 72. This truncation is also described elsewhere herein, in conjunction with other figures. The shape produced by this method is difficult and virtually impossible to produce by simply molding. Various machining methods are possible, but a preferred machining method is grinding. Another preferred machining method is cooling the seal to make it more rigid (less flexible) and then using a single point cutting tool and a lathe-turning operation to axially shorten the originally molded shape. It should also be understood that the original molded length 98 is an axial distance between the original lubricant end 94 and the second seal end 26, and the machined length 100 is an axial distance between the first seal end 24 and the second seal end 26.

In this embodiment, the machining process preferably causes the plastic liner 30 to terminate at the first seal end 24, producing the first liner end 82. As stated above, this desirable configuration is virtually impossible to produce by molding. The reason this configuration is desirable is because it is more resistant to radial deformation when the pressure acting on the second seal end 26 is greater than the pressure acting on the first seal end 24 (and greater than the pressure acting on the inner surface of the portion of the plastic liner 30 that is radially spaced front the relatively rotatable surface that is shown in several other figures).

By removing the length 102 from the initial molded version of the rotary seal, differential pressure acting from the second seal end 26 of the rotary seal 4 can no longer act on and through the removed portion of the elastomeric energizer 32 that was previously located within length 102, and therefore can no longer act radially inward on the portion of the plastic liner 30 that was previously located within length 102. This significantly increases the ability of the rotary seal 4 to operate with relatively high differential pressure acting from the second seal end 26, by reducing the radial deformation on the portion of the plastic liner 30 that is radially spaced from the relatively rotatable surface that is shown in several other figures.

By removing the length 102 from the initial molded version of the rotary seal, the portion of the rotary seal that is not intended to touch the relatively rotatable shaft is axially shorter and stiffer, and more resistant to differential pressure-induced radial deformation. Another way of referencing this improvement is that after the machining operation, the axial distance between the dynamic sealing surface 12 and the first seal end 24 is shorter than the axial distance between the dynamic sealing surface 12 and the original lubricant end 94.

Preferably, during molding of the rotary seal 4, the elastomer that forms the elastomeric energizer 32 has a molding pressure, and this pressure forms the plastic liner 30 to the complex shape shown in the figures herein. Prior to molding, the plastic liner 30 is typically a simple lathe-turned sleeve, without the complex surface geometry that is shown by the figures herein.

A significant problem may occur when molding a seal to the original molded length 98 that is illustrated in FIG. 1K. This is because the axial length of the portion of the plastic liner 30 that is located to the left of the inside corner 97 is relatively short and therefore relatively stiff, and the molding pressure doesn't always hold that portion of the plastic liner 30 tightly to the cavity of the mold during the molding process. Sometimes, as a result, the elastomer inadvertently migrates to the wrong side of the plastic liner 30, such that a layer of elastomer may form part of the recess 54, such as part of the ramp section 50, part of the recess fillet 58, and even part of the recess flank 52. At the very least, such inadvertent elastomer migration is cosmetically undesirable. Such elastomer migration is also believed to have a negative effect on seal performance. When severe elastomer migration is present, the seals are rejected, and such rejection adds significantly to the cost of molding the rotary seal 4.

A breakthrough insight, leading to the solution described below, occurred when the inventor recognized that the outside corner of the mold cavity that forms the inside corner 97 of the rotary seal 4 acts as a fulcrum during the molding process. Because of this fulcrum effect, the molding pressure acting on the long portion of the plastic liner 30 on the right side of the inside corner 97 tends to lift the short portion that is located to the left of the inside corner 97. This moves the plastic liner 30 away from the surface of the mold cavity, allowing the undesirable elastomer migration to occur.

The inventor has determined that the elastomer migration problem can be addressed by molding the rotary seal 4 to a length that is longer than the original molded length 98 that is illustrated. This allows the portion of the plastic liner 30 that is located to the left of the inside corner 97 to be longer and more flexible, so that rubber pressure can hold that portion of the plastic liner tightly to the cavity of the mold during the molding process, inhibiting or entirely preventing the rubber migration problem described above. A dramatically lowered reject rate provides a valuable commercial advantage.

Space, and particularly axial length, is at a premium in many types of equipment, and often cannot be frittered away in accommodating unnecessary seal length. When the above method (molding the seal longer, so it can have a longer liner) is used to mitigate the elastomer migration problem, the resulting seal can then be machined to any desired axial length. For example, the described longer seal can be machined down to the machined length 100 that is shown in FIG. 1K. For another example, the longer seal can be machined down to a length that matches the original molded length 98 that is illustrated in FIG. 1K, to conserve seal and equipment length while having a seal that avoids or largely avoids the rubber migration issues described above.

Description of FIG. 1L

FIG. 1L is an enlarged fragmentary view that better illustrates the method whereby the rubber migration problem described above can be minimized or avoided while manufacturing a plastic lined rotary seal. FIG. 1L corresponds to the same angular location as FIGS. 1A, 1B, 1F and 1K, and shows the rotary seal 4 before and after a machining operation.

A rotary seal 4 is provided that has preferably been formed by molding, has an original molded length 98 that is longer than the original molded length 98 of FIG. 1K, and preferably defines the following features of the present invention: the dynamic sealing surface 12, second seal end 26, plastic liner 30, enlarged rim 34, elastomeric energizer 32, static sealing surface 36, exclusionary intersection 44, exclusion intersection 46, ramp section 50 of the multi-function edge, recess flank 52, recess 54, recess fillet 58, static sealing lip 60, body outer peripheral surface 62, original lubricant end 94, and an inside corner 97 between the radially inward-facing body inner surface 96 and the angled flank 72.

In the initial molded version of the rotary seal 4 that is shown in FIG. 1L, the portion of the plastic liner 30 that is to the left of the inside corner 97 is longer than the comparable portion of the plastic liner that is shown in FIG. 1K. This added length means that the initial molded version of the rotary seal 4 in FIG. 1L can be molded with little or none of the undesirable elastomer migration that is described above. As a result, the reject rate is less, which provides a commercial advantage.

Preferably, the initial molded version of the seal is shortened from the original molded length 98 to the machined length 100 by a machining process such as grinding that removes length 102, producing the first seal end 24 (shown by phantom line). This machining process also preferably produces the inner body corner 74 and the outer body corner 76 that are described in various places throughout this specification. The machining process preferably eliminates the original lubricant end 94 and the original body inner surface 96. The machining process preferably also eliminates a circumferential portion of the angled flank 72 that is located between the ramp section 50 and the original body inner surface 96. It should be understood that the machining process, and the first seal end 24 that the machining process produces, literally truncate the ramp section 50 of the multi-function edge and the angled flank 72. Preferably, the machining process causes the plastic liner 30 to terminate at the first seal end 24, producing the first liner end 82.

Alternately, the molded seal can be shortened by length 104, machining the molded seal from the original molded length 98 to a machined length 106 that is comparable to the relatively compact original molded length 98 that is shown in FIG. 1K, although the plastic liner 30 extends to the first seal end at the machined length 106. This method of molding and then machining can be used to produce the prior art seal geometry more economically than in the past, because the reject rate due to inadvertent elastomer migration is significantly reduced.

NOMENCLATURE LIST machine assembly 2
rotary seal 4
relatively rotatable surface 6
first fluid 8
second fluid 10
dynamic sealing surface 12
first machine component 14
seal groove 16
first groove wall 18
second groove wall 20
second machine component 22
first seal end 24
second seal end 26
peripheral wall 28
plastic liner 30
generally radially inward-facing surface 31
elastomeric energizer 32
enlarged rim 34
static sealing surface 36
adjoining zone 38
zone first end 40
zone second end 42
exclusionary intersection 44
exclusion intersection 46
chamber 48
ramp section 50
recess flank 52
recess 54
recess fillet 58
static sealing lip 60
body outer peripheral surface 62
wave 64
multi-function edge 66
first circumferential wave end 68
second circumferential wave end 69
first edge end 70
second edge end 71
angled flank 72
inner body corner 74
first arris 74A
second arris 74B
extrusion gap clearance 75 outer body corner 76
intersection angle 78
elongated recessed region 80
first liner end 82
second liner end 83
liner outer surface 84
energizer inner surface 86
rim outer surface 88
liner mating surface 89
first ramp end 90
second ramp end 92
original lubricant end 94
original body inner surface 96
inside corner 97
original molded length 98
machined length 100
length 102
length 104
machined length 106

Conclusion

In view of the foregoing it is evident that the present invention is one that is well adapted to attain all of the objects and features hereinabove set forth, together with other objects and features which are inherent in the apparatus disclosed herein.

Even though specific hydrodynamic rotary seal and seal gland geometries are disclosed in detail herein, other geometrical variations employing the basic principles and teachings of this invention are possible.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A rotary seal for location by a first machine component and for dynamic sealing engagement with a generally cylindrical relatively rotatable surface of a second machine component and for serving as a partition between a first fluid of a lubricant supply and a second fluid and for retaining a volume of said first fluid, the rotary seal being generally ring-shaped and comprising:

generally axially-facing surfaces forming a first seal end and a second seal end, said first seal end and said second seal end facing in generally opposite directions;

a plastic liner having a generally radially inward-facing surface extending from said first seal end to said second seal end, said generally radially inward-facing surface comprising:

a dynamic sealing surface of annular form facing in a radially inward direction and adjoining said second seal end;

a multi-function edge extending in a generally circumferential direction and located in intermediate relation to said dynamic sealing surface and said first seal end, said multi-function edge having a first edge end circumferentially separated from a second edge end, at least a portion of said multi-function edge skewed with respect to said second seal end and at least a portion being generally convex when viewed in longitudinal cross-section, said first edge end being farther from said second seal end compared to said second edge end;

a circumferential portion of said multi-function edge forming a ramp section having a first ramp end at said first edge end and having a second ramp end intermediate to said first edge end and said second edge end, said ramp section curving radially outward from said second ramp end and said ramp section being recessed relative to said dynamic sealing surface at said first ramp end;

an angled flank located in intermediate relation to and adjoining said first seal end and said multi-function edge and forming an obtuse angle with said first seal end;

a recess flank located in intermediate relation to said dynamic sealing surface and said ramp section and adjoining said dynamic sealing surface, at least a portion of said recess flank being generally convex when viewed in longitudinal cross-section; and a recess located in intermediate relation to said dynamic sealing surface and said first seal end and formed at least in part from said ramp section and said recess flank, at least a portion of said recess having a sloping profile in a circumferential direction and forming a smooth transition with said dynamic sealing surface in a circumferential direction; and said plastic liner forming a part of said first seal end and forming an inner body corner with said angled flank and said ramp section, said inner body corner undulating radially at said first seal end.

2. The rotary seal of claim 1, wherein said first seal end has a radial depth that varies.

3. The rotary seal of claim 1, wherein said inner body corner is substantially parallel to said second seal end.

4. The rotary seal of claim 1, wherein said angled flank is circumferentially discontinuous.

5. The rotary seal of claim 1, wherein no portion of said angled flank is located between said first ramp end and said first seal end.

6. The rotary seal of claim 1, wherein said first ramp end adjoins said first seal end.

7. The rotary seal of claim 1, wherein said plastic liner forming part of said first seal end comprises a first liner end facing in an axial direction.

8. The rotary seal of claim 1, wherein said plastic liner includes a second liner end facing in an axial direction forming part of said second seal end.

9. The rotary seal of claim 8, wherein said plastic liner forms an exclusionary intersection at the intersection of said second liner end and said dynamic sealing surface.

10. The rotary seal of claim 1, wherein said generally axially-facing surface forming said first seal end is a planar surface.

11. A rotary seal for location by a first machine component and for dynamic sealing engagement with a generally cylindrical relatively rotatable surface of a second machine component and for serving as a partition between a first fluid of a lubricant supply and a second fluid and for retaining a volume of said first fluid, the rotary seal being generally ring-shaped and comprising:

generally axially-facing surfaces forming a first seal end and a second seal end, said first seal end and said second seal end facing in generally opposite directions;

a dynamic sealing surface of annular form facing in a radially inward direction and located in intermediate relation to said first seal end and said second seal end;

a multi-function edge extending in a generally circumferential direction and located in intermediate relation to said dynamic sealing surface and said first seal end and having a first edge end and a second edge end, said first edge end being circumferentially separated from said second edge end, at least a portion of said multi-function edge skewed with respect to said second seal end and at least a portion being generally convex when viewed in longitudinal cross-section, said first edge end being farther from said second seal end compared to said second edge end;

an angled flank located in intermediate relation to and adjoining said first seal end and said multi-function edge and forming an obtuse angle with said first seal end;

a circumferential portion of said multi-function edge forming a ramp section having a first ramp end at said first edge end and having a second ramp end intermediate to said first edge end and said second edge end, said ramp section curving radially outward from said second ramp end and said ramp section being recessed relative to said dynamic sealing surface at said first ramp end;

a recess flank located in intermediate relation to said dynamic sealing surface and said ramp section and adjoining said dynamic sealing surface, at least a portion of said recess flank being generally convex when viewed in longitudinal cross-section;

a recess located in intermediate relation to said dynamic sealing surface and said first seal end and formed at least in part from said ramp section and said recess flank, at least a portion of said recess having a sloping profile in a circumferential direction and forming a smooth transition with said dynamic sealing surface in a circumferential direction;

said first seal end adjacent to and forming an inner body corner with said angled flank and with said ramp section, said first seal end having a radial depth that varies and said inner body corner undulating in a radial direction.

12. The rotary seal of claim 11, wherein said inner body corner is substantially parallel to said second seal end.

13. The rotary seal of claim 11, wherein said angled flank is circumferentially discontinuous.

14. The rotary seal of claim 11, wherein no portion of said angled flank is located between said first ramp end and said first seal end.

15. The rotary seal of claim 11, further comprising a plastic liner forming at least part of said dynamic sealing surface, said plastic liner having a first liner end facing in an axial direction and forming part of said first seal end.

16. The rotary seal of claim 11, further comprising a plastic liner forming at least part of said dynamic sealing surface, said plastic liner terminating at and forming a part of said first seal end and forming said inner body corner, said plastic liner undulating radially at said first seal end.

17. The rotary seal of claim 11, further comprising a plastic liner forming said dynamic sealing surface, said multi-function edge, said recess flank and said angled flank, said plastic liner forming a part of said first seal end and undulating radially at said first seal end.

18. A method for producing an improved rotary seal, comprising:
(a) providing a generally ring-shaped seal having
an original lubricant end and a second seal end facing in generally opposite axial directions;

a generally radially inward-facing dynamic sealing surface of annular form located in intermediate relation to the original lubricant end and the second seal end;

a multi-function edge extending in a generally circumferential direction and located in intermediate relation to the dynamic sealing surface and the original lubricant end, the multi-function edge having a first edge end circumferentially separated from a second edge end, at least a portion of the multi-function edge being generally convex when viewed in longitudinal cross-section, the first edge end being farther from the second seal end compared to the second edge end;

an angled flank located in intermediate relation to the original lubricant end and the multi-function edge;

a circumferential portion of the multi-function edge forming a ramp section having a first ramp end at the first edge end and a second ramp end intermediate to the first edge end and the second edge end, the ramp section curving radially outward from the second ramp end and the ramp section being recessed relative to the dynamic sealing surface at the first ramp end;

a recess flank located in intermediate relation to a portion of the dynamic sealing surface and the ramp section and adjoining the dynamic sealing surface, at least a portion of the recess flank being generally convex when viewed in longitudinal cross-section;

a recess located in intermediate relation to a portion of the dynamic sealing surface and the original lubricant end, the recess formed at least in part from the ramp section and the recess flank, at least a portion of the recess having a sloping profile in a circumferential direction and forming a smooth transition with the dynamic sealing surface in the circumferential direction, wherein a plastic liner forms the dynamic sealing surface; and (b) shortening the seal axially by a machining process, removing the original lubricant end and producing a first seal end.

19. The method of claim 18, wherein the step of shortening the seal axially by a machining process comprises truncating the ramp section and the angled flank.

20. The method of claim 18, wherein the step of shortening the seal axially by a machining process removes a portion of the plastic liner and produces a first liner end that is a generally axially-facing machined end of the plastic liner.

21. The method of claim 18, wherein the step of shortening the seal axially by a machining process causes the plastic liner to terminate at the first seal end.

22. The method of claim 18, wherein the step of shortening the seal axially by a machining process removes a portion of the angled flank adjacent to the ramp section.

23. The method of claim 18, wherein the step of shortening the seal axially by a machining process removes a circumferential portion of the angled flank.

24. The method of claim 18, wherein the original lubricant end has a surface area and the step of shortening the seal axially by a machining process produces the first seal end at an axial location that results in a surface area of the first seal end being greater than the surface area of the original lubricant end.

25. The method of claim 18, wherein the original lubricant end has a radial depth and the step of shortening the seal axially by a machining process produces the first seal end at an axial location that results in a radial depth of the first seal end being greater than the radial depth of the original lubricant end.

26. The method of claim 18, wherein the step of shortening the seal axially by a machining process causes the axial distance between the dynamic sealing surface and the first seal end to be shorter than the axial distance between the dynamic sealing surface and the original lubricant end.

27. The method of claim 18, wherein the step of shortening the seal axially by a machining process creates an inner body corner between the angled flank and the first seal end, the inner body corner being an outside corner.

28. The method of claim 18, wherein the step of shortening the seal axially by a machining process creates an inner body corner between the ramp section and the first seal end, the inner body corner being an obtuse outside corner.

29. The method of claim 18, wherein the seal has a generally radially inward-facing original body inner surface adjoining the original lubricant end and located in intermediate relation to the original lubricant end and the angled flank, and the step of shortening the seal axially by a machining process removes all of the original body inner surface.

30. The method of claim 29, wherein the seal has an inside corner between the original body inner surface and the angled flank, and the step of shortening the seal axially by a machining process removes the inside corner.

31. The method of claim 18, wherein the plastic liner forms the angled flank, and the step of shortening the seal axially by a machining process removes a portion of the angled flank adjacent to the ramp section.

32. The method of claim 18, wherein the plastic liner forms the angled flank, and the step of shortening the seal axially by a machining process removes a circumferential portion of the angled flank.

33. The method of claim 18, wherein the plastic liner forms the multi-function edge, the recess flank and the angled flank, and the step of shortening the seal axially by a machining process, removing the original lubricant end and producing a first seal end results in the plastic liner forming a part of the produced first seal end with the plastic liner undulating radially at the first seal end.

* * * * *